(12) United States Patent
Goenka

(10) Patent No.: US 8,424,315 B2
(45) Date of Patent: Apr. 23, 2013

(54) THERMOELECTRIC DEVICE EFFICIENCY ENHANCEMENT USING DYNAMIC FEEDBACK

(75) Inventor: Lakhi Nandlal Goenka, Ann Arbor, MI (US)

(73) Assignee: BSST LLC, Irwindale, CA (US)

( * ) Notice: Subject to any disclaimer, the term of this patent is extended or adjusted under 35 U.S.C. 154(b) by 161 days.

(21) Appl. No.: 13/006,310

(22) Filed: Jan. 13, 2011

(65) Prior Publication Data

US 2011/0107772 A1    May 12, 2011

Related U.S. Application Data

(63) Continuation of application No. 11/377,465, filed on Mar. 16, 2006, now Pat. No. 7,870,745.

(51) Int. Cl.
*F25B 21/02*    (2006.01)

(52) U.S. Cl.
USPC ............................................... 62/3.2

(58) Field of Classification Search ............ 62/3.2, 62/3.3, 3.61, 3.7
See application file for complete search history.

(56) References Cited

U.S. PATENT DOCUMENTS

| | | |
|---|---|---|
| 1,120,781 A | 12/1914 | Altenkirch et al. |
| 2,944,404 A | 7/1960 | Fritts |
| 2,984,077 A | 5/1961 | Gaskill |
| 2,992,538 A | 7/1961 | Siegfried |
| 3,004,393 A | 10/1961 | Alsing |
| 3,006,979 A | 10/1961 | Rich |
| 3,019,609 A | 2/1962 | Pietsch |
| 3,071,495 A | 1/1963 | Hanlein |
| 3,085,405 A | 4/1963 | Frantti |
| 3,125,860 A | 3/1964 | Reich |
| 3,137,142 A | 6/1964 | Venema |
| 3,138,934 A | 6/1964 | Roane |
| 3,178,895 A | 4/1965 | Mole et al. |
| 3,197,342 A | 7/1965 | Neild, Jr. |
| 3,212,275 A | 10/1965 | Tillman, Jr. |
| 3,213,630 A | 10/1965 | Mole |
| 3,236,056 A | 2/1966 | Phillips et al. |
| 3,252,504 A | 5/1966 | Newton |
| 3,391,727 A | 7/1968 | Topouszian |

(Continued)

FOREIGN PATENT DOCUMENTS

| | | |
|---|---|---|
| CN | 1195090 | 10/1998 |
| CN | 1249067 A | 3/2000 |

(Continued)

OTHER PUBLICATIONS

Derwent-ACC-No. 1998-283540, Kwon, H et al., Hyundai Motor Co., corresponding to KR 97026106 A, published Jun. 24, 1997 (2 pages).

(Continued)

*Primary Examiner* — Melvin Jones
(74) *Attorney, Agent, or Firm* — Knobbe, Martens, Olson & Bear, LLP

(57) ABSTRACT

A cooling system is disclosed including a first heat exchanger, a second heat exchanger, a means for regulating a flow of a fluid, and a thermoelectric device for cooling a fluid, wherein a difference in temperature between a hot side and a cold side of the thermoelectric device is minimized and an efficiency of the thermoelectric device is maximized.

21 Claims, 5 Drawing Sheets

U.S. PATENT DOCUMENTS

| | | | |
|---|---|---|---|
| 3,505,728 A | 4/1970 | Hare et al. |
| 3,527,621 A | 9/1970 | Newton |
| 3,554,815 A | 1/1971 | Osborn |
| 3,599,437 A | 8/1971 | Panas |
| 3,607,444 A | 9/1971 | Debucs |
| 3,626,704 A | 12/1971 | Coe, Jr. |
| 3,635,037 A | 1/1972 | Hubert |
| 3,663,307 A | 5/1972 | Mole |
| 3,681,929 A | 8/1972 | Schering |
| 3,726,100 A | 4/1973 | Widakowich |
| 3,779,307 A | 12/1973 | Weiss et al. |
| 3,885,126 A | 5/1975 | Sugiyama et al. |
| 3,958,324 A | 5/1976 | Alais et al. |
| 4,038,831 A | 8/1977 | Gaudel et al. |
| 4,047,093 A | 9/1977 | Levoy |
| 4,055,053 A | 10/1977 | Elfving |
| 4,065,936 A | 1/1978 | Fenton et al. |
| 4,125,122 A | 11/1978 | Stachurski |
| 4,281,516 A | 8/1981 | Berthet et al. |
| 4,297,841 A | 11/1981 | Cheng |
| 4,297,849 A | 11/1981 | Buffet |
| 4,402,188 A | 9/1983 | Skala |
| 4,420,940 A | 12/1983 | Buffet |
| 4,444,851 A | 4/1984 | Maru |
| 4,448,028 A | 5/1984 | Chao et al. |
| 4,494,380 A | 1/1985 | Cross |
| 4,499,329 A | 2/1985 | Benicourt et al. |
| 4,634,803 A | 1/1987 | Mathiprakasam |
| 4,665,707 A | 5/1987 | Hamilton |
| 4,730,459 A | 3/1988 | Schlicklin et al. |
| 4,802,929 A | 2/1989 | Schock |
| 4,823,554 A | 4/1989 | Trachtenberg et al. |
| 4,848,090 A | 7/1989 | Peters |
| 4,858,069 A | 8/1989 | Hughes |
| 4,905,475 A | 3/1990 | Tuomi |
| 4,907,060 A | 3/1990 | Nelson et al. |
| 4,922,721 A | 5/1990 | Robertson et al. |
| 4,922,998 A | 5/1990 | Carr |
| 4,989,626 A | 2/1991 | Takagi et al. |
| 5,006,178 A | 4/1991 | Bijvoets |
| 5,029,446 A | 7/1991 | Suzuki |
| 5,038,569 A | 8/1991 | Shirota et al. |
| 5,092,129 A | 3/1992 | Bayes et al. |
| 5,097,829 A | 3/1992 | Quisenberry |
| 5,111,664 A | 5/1992 | Yang |
| 5,119,640 A | 6/1992 | Conrad |
| 5,167,129 A | 12/1992 | Akasaka |
| 5,171,372 A | 12/1992 | Recine, Sr. |
| 5,180,293 A | 1/1993 | Hartl |
| 5,193,347 A | 3/1993 | Apisdorf |
| 5,228,923 A | 7/1993 | Hed |
| 5,232,516 A | 8/1993 | Hed |
| 5,254,178 A | 10/1993 | Yamada et al. |
| 5,291,960 A | 3/1994 | Brandenburg et al. |
| 5,316,078 A | 5/1994 | Cesaroni |
| 5,385,020 A | 1/1995 | Gwilliam et al. |
| 5,407,130 A | 4/1995 | Uyeki et al. |
| 5,419,780 A | 5/1995 | Suski |
| 5,419,980 A | 5/1995 | Okamoto et al. |
| 5,429,680 A | 7/1995 | Fuschetti |
| 5,430,322 A | 7/1995 | Koyanagi et al. |
| 5,431,021 A | 7/1995 | Gwilliam et al. |
| 5,450,894 A | 9/1995 | Inoue et al. |
| 5,456,081 A | 10/1995 | Chrysler et al. |
| 5,483,807 A | 1/1996 | Abersfelder et al. |
| 5,499,504 A | 3/1996 | Mill et al. |
| 5,544,487 A | 8/1996 | Attey et al. |
| 5,549,153 A | 8/1996 | Baruschke et al. |
| 5,561,981 A | 10/1996 | Quisenberry et al. |
| 5,566,774 A | 10/1996 | Yoshida |
| 5,576,512 A | 11/1996 | Doke |
| 5,584,183 A | 12/1996 | Wright et al. |
| 5,592,363 A | 1/1997 | Atarashi et al. |
| 5,594,609 A | 1/1997 | Lin |
| 5,653,111 A | 8/1997 | Attey et al. |
| 5,682,748 A | 11/1997 | DeVilbiss et al. |
| 5,705,770 A | 1/1998 | Ogassawara et al. |
| 5,713,426 A | 2/1998 | Okamura |
| 5,722,249 A | 3/1998 | Miller, Jr. |
| 5,725,048 A | 3/1998 | Burk et al. |
| 5,802,856 A | 9/1998 | Schaper et al. |
| 5,822,993 A | 10/1998 | Attey |
| 5,860,472 A | 1/1999 | Batchelder |
| 5,867,990 A | 2/1999 | Ghoshal |
| 5,890,371 A | 4/1999 | Rajasubramanian et al. |
| 5,901,572 A | 5/1999 | Peiffer et al. |
| 5,921,088 A | 7/1999 | Imaizumi et al. |
| 5,959,341 A | 9/1999 | Tsuno et al. |
| 5,964,092 A | 10/1999 | Tozuka et al. |
| 5,966,941 A | 10/1999 | Ghoshal |
| 5,975,856 A | 11/1999 | Welle |
| 5,977,785 A | 11/1999 | Burward-Hoy |
| 5,987,890 A | 11/1999 | Chiu et al. |
| 6,000,225 A | 12/1999 | Ghoshal |
| 6,028,263 A | 2/2000 | Kobayashi et al. |
| 6,050,326 A | 4/2000 | Evans |
| 6,059,198 A | 5/2000 | Moroi et al. |
| 6,082,445 A | 7/2000 | Dugan |
| 6,084,172 A | 7/2000 | Kishi et al. |
| 6,096,966 A | 8/2000 | Nishimoto et al. |
| 6,105,659 A | 8/2000 | Pocol et al. |
| 6,119,463 A | 9/2000 | Bell |
| 6,122,588 A | 9/2000 | Shehan et al. |
| 6,127,766 A | 10/2000 | Roidt |
| 6,138,749 A | 10/2000 | Kawai et al. |
| 6,158,225 A | 12/2000 | Muto et al. |
| 6,203,939 B1 | 3/2001 | Wilson |
| 6,205,805 B1 | 3/2001 | Takahashi et al. |
| 6,213,198 B1 | 4/2001 | Shikata et al. |
| 6,223,539 B1 | 5/2001 | Bell |
| 6,230,496 B1 | 5/2001 | Hofmann et al. |
| 6,270,015 B1 | 8/2001 | Hirota |
| 6,282,907 B1 | 9/2001 | Ghoshal |
| 6,302,196 B1 | 10/2001 | Haussmann |
| 6,324,860 B1 | 12/2001 | Maeda et al. |
| 6,334,311 B1 | 1/2002 | Kim et al. |
| 6,346,668 B1 | 2/2002 | McGrew |
| 6,347,521 B1 | 2/2002 | Kadotani et al. |
| 6,357,518 B1 | 3/2002 | Sugimoto et al. |
| 6,366,832 B2 | 4/2002 | Lomonaco et al. |
| 6,385,976 B1 | 5/2002 | Yamamura et al. |
| 6,393,842 B2 | 5/2002 | Kim |
| 6,401,462 B1 | 6/2002 | Bielinski |
| 6,407,435 B1 | 6/2002 | Ma et al. |
| 6,412,287 B1 | 7/2002 | Hughes et al. |
| 6,446,442 B1 | 9/2002 | Batchelor et al. |
| 6,457,324 B2 | 10/2002 | Zeigler et al. |
| 6,464,027 B1 | 10/2002 | Dage et al. |
| 6,474,073 B1 | 11/2002 | Uetsuji et al. |
| 6,477,844 B2 | 11/2002 | Ohkubo et al. |
| 6,481,213 B2 | 11/2002 | Carr et al. |
| 6,499,306 B2 | 12/2002 | Gillen |
| 6,510,696 B2 | 1/2003 | Guttman et al. |
| 6,530,231 B1 | 3/2003 | Nagy et al. |
| 6,539,725 B2 | 4/2003 | Bell |
| 6,539,729 B2 | 4/2003 | Tupis et al. |
| 6,541,139 B1 | 4/2003 | Cibuzar |
| 6,548,750 B1 | 4/2003 | Picone |
| 6,554,088 B2 | 4/2003 | Severinsky et al. |
| 6,560,968 B2 | 5/2003 | Ko |
| 6,563,039 B2 | 5/2003 | Caillat et al. |
| RE38,128 E | 6/2003 | Gallup et al. |
| 6,580,025 B2 | 6/2003 | Guy |
| 6,598,403 B1 | 7/2003 | Ghoshal |
| 6,598,405 B2 | 7/2003 | Bell |
| 6,605,773 B2 | 8/2003 | Kok |
| 6,606,866 B2 | 8/2003 | Bell |
| 6,606,877 B2 | 8/2003 | Tomita et al. |
| 6,611,115 B2 | 8/2003 | Wakashiro et al. |
| 6,625,990 B2 | 9/2003 | Bell |
| 6,637,210 B2 | 10/2003 | Bell |
| 6,672,076 B2 | 1/2004 | Bell |
| 6,682,844 B2 | 1/2004 | Gene |
| 6,705,089 B2 | 3/2004 | Chu et al. |
| 6,722,139 B2 | 4/2004 | Moon et al. |
| 6,732,534 B2 | 5/2004 | Spry |
| 6,779,348 B2 | 8/2004 | Taban |

| | | |
|---|---|---|
| 6,792,259 B1 | 9/2004 | Parise |
| 6,796,399 B2 | 9/2004 | Satou et al. |
| 6,803,766 B2 | 10/2004 | Kobayashi et al. |
| 6,810,977 B2 | 11/2004 | Suzuki |
| 6,812,395 B2 | 11/2004 | Bell |
| 6,862,892 B1 | 3/2005 | Meyer et al. |
| 6,880,346 B1 | 4/2005 | Tseng et al. |
| 6,886,356 B2 | 5/2005 | Kubo et al. |
| 6,894,369 B2 | 5/2005 | Irino et al. |
| 6,896,047 B2 | 5/2005 | Currle et al. |
| 6,907,739 B2 | 6/2005 | Bell |
| 6,942,728 B2 | 9/2005 | Caillat et al. |
| 6,948,321 B2 | 9/2005 | Bell |
| 6,959,555 B2 | 11/2005 | Bell |
| 6,973,799 B2 | 12/2005 | Kuehl et al. |
| 6,975,060 B2 | 12/2005 | Styblo et al. |
| 7,007,491 B2 | 3/2006 | Grimm et al. |
| 7,089,756 B2 | 8/2006 | Hu |
| 7,100,369 B2 | 9/2006 | Yamaguchi et al. |
| 7,111,465 B2 | 9/2006 | Bell |
| 7,134,288 B2 | 11/2006 | Crippen et al. |
| 7,231,772 B2 | 6/2007 | Bell |
| 7,235,735 B2 | 6/2007 | Venkatasubramanian et al. |
| 7,246,496 B2 | 7/2007 | Goenka et al. |
| 7,310,953 B2 | 12/2007 | Pham et al. |
| 7,380,586 B2 | 6/2008 | Gawthrop |
| 7,421,845 B2 | 9/2008 | Bell |
| 7,426,835 B2 | 9/2008 | Bell |
| 7,587,902 B2 | 9/2009 | Bell |
| 7,743,614 B2 | 6/2010 | Goenka et al. |
| 7,779,639 B2 | 8/2010 | Goenka |
| 7,870,745 B2 * | 1/2011 | Goenka ..................... 62/3.2 |
| 7,926,293 B2 | 4/2011 | Bell |
| 7,932,460 B2 | 4/2011 | Bell |
| 8,069,674 B2 | 12/2011 | Bell |
| 8,079,223 B2 | 12/2011 | Bell |
| 2001/0029974 A1 | 10/2001 | Cohen et al. |
| 2003/0084935 A1 | 5/2003 | Bell |
| 2003/0094265 A1 | 5/2003 | Chu et al. |
| 2003/0106677 A1 | 6/2003 | Memory et al. |
| 2003/0140636 A1 | 7/2003 | Van Winkle |
| 2003/0217738 A1 | 11/2003 | Ryon |
| 2004/0025516 A1 * | 2/2004 | Van Winkle ..................... 62/3.3 |
| 2004/0045594 A1 | 3/2004 | Hightower |
| 2004/0089336 A1 | 5/2004 | Hunt |
| 2004/0093889 A1 | 5/2004 | Bureau et al. |
| 2004/0237541 A1 | 12/2004 | Murphy |
| 2004/0261829 A1 | 12/2004 | Bell |
| 2004/0267408 A1 | 12/2004 | Kramer |
| 2005/0067862 A1 | 3/2005 | Iqbal et al. |
| 2005/0074646 A1 | 4/2005 | Rajashekara et al. |
| 2005/0081834 A1 | 4/2005 | Perkins |
| 2005/0121065 A1 | 6/2005 | Otey |
| 2005/0139692 A1 | 6/2005 | Yamamoto |
| 2005/0158607 A1 | 7/2005 | Vyas et al. |
| 2005/0178128 A1 | 8/2005 | Harwood et al. |
| 2005/0247336 A1 | 11/2005 | Inaoka |
| 2005/0257531 A1 | 11/2005 | Kadle et al. |
| 2005/0263176 A1 | 12/2005 | Yamaguchi et al. |
| 2005/0268621 A1 | 12/2005 | Kadle et al. |
| 2005/0278863 A1 | 12/2005 | Bahash et al. |
| 2005/0279105 A1 | 12/2005 | Pastorino |
| 2006/0005548 A1 | 1/2006 | Ruckstuhl |
| 2006/0075758 A1 | 4/2006 | Rice et al. |
| 2006/0086118 A1 | 4/2006 | Venkatasubramanian et al. |
| 2006/0124165 A1 | 6/2006 | Bierschenk et al. |
| 2006/0150657 A1 | 7/2006 | Spurgeon et al. |
| 2006/0168969 A1 | 8/2006 | Mei et al. |
| 2006/0174633 A1 | 8/2006 | Beckley |
| 2006/0188418 A1 | 8/2006 | Park et al. |
| 2006/0219281 A1 | 10/2006 | Kuroyanagi et al. |
| 2006/0254284 A1 | 11/2006 | Ito et al. |
| 2006/0254285 A1 | 11/2006 | Lin |
| 2007/0000255 A1 | 1/2007 | Elliot et al. |
| 2007/0017666 A1 | 1/2007 | Goenka et al. |
| 2007/0056295 A1 | 3/2007 | De Vilbiss |
| 2007/0214799 A1 | 9/2007 | Goenka |
| 2007/0220902 A1 | 9/2007 | Matsuoka et al. |
| 2007/0272290 A1 | 11/2007 | Sims et al. |
| 2008/0028769 A1 | 2/2008 | Goenka |
| 2008/0115818 A1 | 5/2008 | Cheng et al. |
| 2008/0173342 A1 | 7/2008 | Bell |
| 2008/0230618 A1 | 9/2008 | Gawthrop |
| 2008/0245398 A1 | 10/2008 | Bell |
| 2008/0289677 A1 | 11/2008 | Bell |
| 2009/0000310 A1 | 1/2009 | Bell et al. |
| 2009/0007572 A1 | 1/2009 | Bell et al. |
| 2009/0007952 A1 | 1/2009 | Kondoh et al. |
| 2009/0293499 A1 | 12/2009 | Bell et al. |
| 2009/0301103 A1 | 12/2009 | Bell et al. |
| 2010/0031987 A1 | 2/2010 | Bell et al. |
| 2010/0031988 A1 | 2/2010 | Bell |
| 2010/0052374 A1 | 3/2010 | Bell et al. |
| 2010/0101238 A1 | 4/2010 | LaGrandeur et al. |
| 2010/0101239 A1 | 4/2010 | LaGrandeur et al. |
| 2010/0326092 A1 | 12/2010 | Goenka |
| 2010/0331657 A1 | 12/2010 | Mensinger et al. |
| 2011/0067742 A1 | 3/2011 | Bell et al. |
| 2011/0162389 A1 | 7/2011 | Bell |
| 2011/0209740 A1 | 9/2011 | Bell et al. |
| 2011/0247668 A1 | 10/2011 | Bell et al. |
| 2012/0111386 A1 | 5/2012 | Bell et al. |

FOREIGN PATENT DOCUMENTS

| | | |
|---|---|---|
| DE | 13 01 454 | 8/1969 |
| DE | 2319155 | 10/1974 |
| DE | 199 51 224 | 5/2001 |
| EP | 0 389 407 | 9/1990 |
| EP | 0418995 B1 | 3/1991 |
| EP | 0 545 021 | 6/1993 |
| EP | 1 324 400 A | 7/2003 |
| EP | 1 475 532 A | 11/2004 |
| EP | 1 515 376 | 3/2005 |
| FR | 1 280 711 A | 1/1962 |
| FR | 2 419 479 A | 10/1979 |
| FR | 2543275 | 9/1984 |
| FR | 2 550 324 A | 2/1985 |
| FR | 2806666 | 9/2001 |
| FR | 2 879 728 | 6/2006 |
| GB | 231 192 A | 5/1926 |
| GB | 817 077 | 7/1959 |
| GB | 952 678 | 3/1964 |
| GB | 1 040 485 | 8/1966 |
| GB | 1151947 | 5/1969 |
| GB | 2 027 534 | 2/1980 |
| GB | 2 267 338 | 12/1993 |
| GB | 2 333 352 | 7/1999 |
| JP | 39-27735 | 12/1964 |
| JP | 56-18231 | 2/1981 |
| JP | 59097457 | 6/1984 |
| JP | 60-80044 | 7/1985 |
| JP | 63-262076 A | 10/1988 |
| JP | 01 131830 A | 5/1989 |
| JP | 01 200122 | 8/1989 |
| JP | 03-263382 | 11/1991 |
| JP | 4-165234 | 6/1992 |
| JP | 04-165234 | 6/1992 |
| JP | 06-089955 | 3/1994 |
| JP | 6-342940 | 12/1994 |
| JP | 7-198284 | 1/1995 |
| JP | A-7-7187 | 1/1995 |
| JP | 07-074397 | 3/1995 |
| JP | 09-321355 | 5/1995 |
| JP | 7 156645 | 6/1995 |
| JP | A-7-202275 | 8/1995 |
| JP | 07-253224 | 10/1995 |
| JP | 07-253264 | 2/1996 |
| JP | A-8-293627 | 11/1996 |
| JP | 09042801 | 2/1997 |
| JP | 9-089284 A | 4/1997 |
| JP | 09-254630 | 9/1997 |
| JP | 09 276076 | 10/1997 |
| JP | 10 012935 | 1/1998 |
| JP | 10035268 | 2/1998 |
| JP | H10-325561 | 8/1998 |
| JP | 10238406 A | 9/1998 |
| JP | 10-275943 | 10/1998 |
| JP | 10290590 | 10/1998 |

| | | |
|---|---|---|
| JP | 11-317481 | 11/1998 |
| JP | 11 046021 | 2/1999 |
| JP | 11-182907 | 7/1999 |
| JP | 11-201475 A | 7/1999 |
| JP | 11-274574 | 10/1999 |
| JP | 2000 018095 | 1/2000 |
| JP | H2000-58930 | 2/2000 |
| JP | 2000-161721 | 6/2000 |
| JP | H2000-214934 | 8/2000 |
| JP | 2000-274788 | 10/2000 |
| JP | 2000-274874 | 10/2000 |
| JP | 01 007263 | 1/2001 |
| JP | 2001-24240 | 1/2001 |
| JP | 2001-210879 | 8/2001 |
| JP | 2001-267642 A | 9/2001 |
| JP | 2001304778 | 10/2001 |
| JP | 2001-336853 | 1/2002 |
| JP | 2002-13758 | 1/2002 |
| JP | 2002059736 A | 2/2002 |
| JP | 2002 232028 A | 8/2002 |
| JP | 2003 175720 A | 6/2003 |
| JP | 2003 332642 | 11/2003 |
| JP | 2004 079883 | 3/2004 |
| JP | 2004-360522 | 12/2004 |
| JP | 2005-212564 | 8/2005 |
| JP | 2005 317648 | 11/2005 |
| JP | 2008 274790 | 11/2008 |
| JP | 2008 300465 | 12/2008 |
| JP | 2009 033806 | 2/2009 |
| LU | 66619 | 2/1973 |
| RU | 2 142 178 | 11/1999 |
| RU | 2 154 875 C2 | 8/2000 |
| SE | 337 227 | 5/1971 |
| SU | 184886 A | 7/1966 |
| SU | 1142711 A | 2/1985 |
| WO | WO 95/01500 | 1/1995 |
| WO | WO 9722486 A1 | 6/1997 |
| WO | WO 97/47930 | 12/1997 |
| WO | WO 9856047 A1 | 12/1998 |
| WO | WO 99/10191 | 3/1999 |
| WO | WO 99/58907 | 11/1999 |
| WO | WO 02/00458 | 1/2002 |
| WO | WO 03/014634 | 2/2003 |
| WO | WO 03/074951 A1 | 9/2003 |
| WO | WO 03/090286 A | 10/2003 |
| WO | WO 03/104726 A1 | 12/2003 |
| WO | WO 2004/019379 A | 3/2004 |
| WO | WO 2005/023571 | 3/2005 |
| WO | WO 2005/020340 A | 5/2005 |
| WO | WO 2005/098225 A | 10/2005 |
| WO | WO 2006/001827 | 1/2006 |
| WO | WO 2006/037178 A | 4/2006 |
| WO | WO 2006/043514 A | 4/2006 |
| WO | WO 2006/064432 | 6/2006 |
| WO | WO 2007/001289 | 1/2007 |
| WO | WO 2007/109368 | 9/2007 |
| WO | WO 2008/013946 A2 | 1/2008 |
| WO | WO 2008/042077 | 4/2008 |
| WO | WO 2008/091293 A2 | 7/2008 |
| WO | WO 2008/148042 | 12/2008 |
| WO | WO 2010/048575 | 4/2010 |

OTHER PUBLICATIONS

Diller, R. W., et al.: "Experimental results confirming improved performance of systems using thermal isolation" Thermoelectrics, 2002. Proceedings ICT '02. Twenty-First International Conference on Aug. 25-29, 2002, Piscataway, NJ USA, IEEE, pp. 548-550, XP010637541 ISBN: 0-7803-7683-8.

Diller, R.W., et al., "Experimental Results Confirming Improved Efficiency of Thermoelectric Power Generation Systems with Alternate Thermodynamic Cycles," 22nd International Conference on Thermoelectrics, 2003, pp. 571-573.

Hendricks, Terry et al., "Advanced Thermoelectric Power System Investigations for Light-Duty and Heavy Duty Applications," National Renewable Energy Laboratory, Center for Transportation Technology & Systems, Colorado, 2002.

Lofy, John et al., "Thermoelectrics for Environmental Control Automobiles," 21st International Conference on Thermoelectronics, 2002, p. 471-476.

Menchen, William R., et al., "Thermoelectric Conversion to Recover Heavy Duty Diesel Exhaust Energy," Teledyne Energy Systems, Timonium, MD 1990.

Miner, A., et al. "Thermo-Electro-Mechanical Refrigeration Based on Transient Thermoelectric Effects", Applied Physics letters, vol. 75, pp. 1176-1178 (1999).

Snyder, G. Jeffrey, et al., "Thermoelectric Effciency and Compatibility," The American Physical Society, Oct. 2, 2003, vol. 91, No. 14.

Tada, S., et al., "A New Concept of Porous Thermoelectric Module Using a Reciprocating Flow for Cooling/Heating Systems (Numerical Analysis for Heating Systems)" 16th International Conference on Thermoelectrics (1977).

Rye et al., "The Flow of Liquids in Surface Grooves"; Langmuir 1996, vol. 12: pp. 555-565.

Zhang et al., Liquid Water Removal from a Polymer Electrolyte Fuel Cell; Journal of the Electrochemical Society, 2006, vol. 153 (2), pp. A225-A232.

\* cited by examiner

THERMOELECTRIC DEVICE EFFICIENCY ENHANCEMENT USING DYNAMIC FEEDBACK

RELATED APPLICATIONS

This application is a continuation of U.S. application Ser. No. 11/377,465, filed Mar. 16, 2006 now U.S. Pat. No. 7,870,745, titled THERMOELECTRIC DEVICE EFFICIENCY ENHANCEMENT USING DYNAMIC FEEDBACK, the entire contents of which are incorporated by reference herein and made a part of this specification.

BACKGROUND

1. Field

The invention relates to a cooling system and more particularly to a cooling system including a first heat exchanger, a second heat exchanger, a means for regulating a flow of a fluid, and a thermoelectric device for cooling a fluid, wherein use of dynamic feedback enhances an efficiency of the thermoelectric device.

2. Description of Related Art

Typically, a passenger compartment of a vehicle is cooled by a cooling system wherein a flow of air is directed through a heat exchanger to cool the air prior to flowing into the passenger compartment. In the heat exchanger, energy is transferred between the air and a coolant such as a water-glycol coolant, for example.

The air is normally supplied from ambient air or a mixture of air re-circulated from the passenger compartment and ambient air.

In other cooling systems for the passenger compartment of the vehicle, a thermoelectric device is used to cool the air to a desired temperature prior to the air flowing into the passenger compartment. The thermoelectric device includes a hot side and a cold side. The cold side of the thermoelectric device is in communication with the air flowing into the passenger compartment. A cooling efficiency of the thermoelectric device decreases as a difference in temperature between the hot side and the cold side thereof increases.

It would be desirable to produce a cooling system for a vehicle including a thermoelectric device wherein a difference in temperature between a hot side and a cold side of the thermoelectric device is minimized and an efficiency of the thermoelectric device is maximized.

SUMMARY

Concordant and congruous with the present invention, a cooling system for a vehicle including a thermoelectric device wherein a difference in temperature between a hot side and a cold side of the thermoelectric device is minimized and an efficiency of the thermoelectric device is maximized, has surprisingly been discovered.

In one embodiment, the cooling system comprises a first heat exchanger adapted to cool a first fluid; a second heat exchanger in fluid communication with said first heat exchanger, wherein a second fluid is cooled to a desired temperature by the first fluid in said second heat exchanger; a thermoelectric device disposed between and in fluid communication with said first heat exchanger and said second heat exchanger, said thermoelectric device adapted to heat the first fluid and cool the second fluid to a temperature lower than the desired temperature; and a first means for regulating flow adapted to circulate the first fluid through said first heat exchanger, and said second heat exchanger, and said thermoelectric device.

In another embodiment, the cooling system comprises a first heat exchanger adapted to cool a first fluid; a second heat exchanger in fluid communication with said first heat exchanger, wherein a second fluid is cooled to a desired temperature by the first fluid in said second heat exchanger; a thermoelectric device disposed between and in fluid communication with said first heat exchanger and said second heat exchanger, said thermoelectric device adapted to heat the first fluid and cool the second fluid to a temperature lower than the desired temperature; a first means for regulating flow adapted to circulate the first fluid through said first heat exchanger, and said second heat exchanger, and said thermoelectric device; and a thermoelectric device bypass having a second means for regulating a flow of the first fluid, wherein the second means for regulating flow causes at least a portion of the first fluid to bypass at least a portion of said thermoelectric device.

In yet another embodiment, the cooling system comprises a first heat exchanger adapted to cool a first fluid; a second heat exchanger in fluid communication with said first heat exchanger, wherein a second fluid is cooled to a desired temperature by the first fluid in said second heat exchanger; a thermoelectric device disposed between and in fluid communication with said first heat exchanger and said second heat exchanger, said thermoelectric device adapted to heat the first fluid and cool the second fluid to a temperature lower than the desired temperature; a first means for regulating flow adapted to circulate the first fluid through said first heat exchanger, and said second heat exchanger, and said thermoelectric device; and a bypass conduit disposed between said first heat exchanger and said thermoelectric device, wherein said bypass conduit facilitates a flow of at least a portion of the first fluid from said first heat exchanger through said bypass conduit to said thermoelectric device.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF PREFERRED EMBODIMENTS

The following detailed description and appended drawings describe and illustrate various exemplary embodiments of the invention. The description and drawings serve to enable one skilled in the art to make and use the invention, and are not intended to limit the scope of the invention in any manner. It is understood that materials other than those described can be used without departing from the scope and spirit of the invention.

FIGS. 1-9 each show the cooling component of an air handling system of a heating, ventilating, and air conditioning (HVAC) system or climate control system (not shown) for a vehicle (not shown) according to an embodiment of the invention. The cooling component is also commonly referred to as a HVAC air handling system in the art. The HVAC system typically provides heating, ventilation, and air conditioning for a passenger compartment (not shown) of the vehicle. The HVAC system, including the cooling component, is adapted to be installed in the engine compartment (not shown) or other available space (not shown) of the vehicle. The HVAC system communicates with the passenger compartment and ambient air through ducting or other conduit systems.

Figure 1:
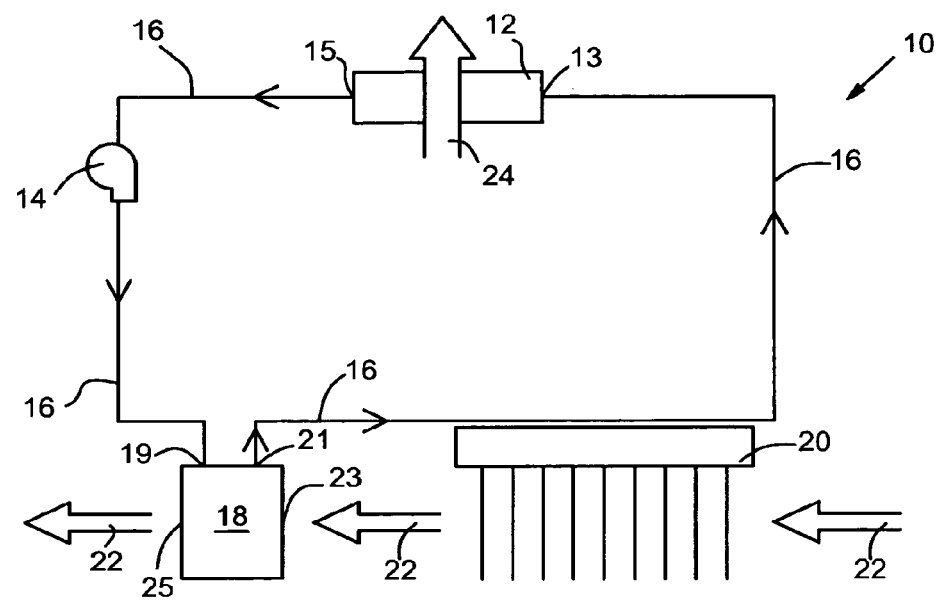
FIG. 1 is a schematic flow diagram of a cooling system according to an embodiment of the invention.

FIG. 1 shows a cooling system 10 that includes a first heat exchanger 12, a first means for regulating flow 14 of a first fluid (not shown) in a conduit 16, a second heat exchanger 18, and a thermoelectric device 20.

The first heat exchanger 12 includes a cold side (not shown) with a first inlet 13 and a first outlet 15, and a hot side (not shown). The cold side is in fluid communication with the first fluid. The first inlet 13 is in fluid communication with the conduit 16 which is in fluid communication with the thermoelectric device 20. The first outlet 15 is in fluid communication with the conduit 16 which is in fluid communication with the first means for regulating flow 14. The hot side is in fluid communication with an ambient air stream 24. In the embodiment shown, the first heat exchanger 12 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 14 is a pump disposed between the first heat exchanger 12 and the second heat exchanger 18. The first means for regulating flow 14 may be any pump, such as a positive displacement pump, centrifugal pump, electrostatic pump, or any other pump known in the art. It is understood that the first means for regulating flow 14 may be any fluid controlling device such as a valve, for example. The first means for regulating flow 14 can be located anywhere on the cooling system 10, as desired.

The second heat exchanger 18 includes a cold side (not shown) with a second inlet 19 and a second outlet 21, and a hot side (not shown) with a third inlet 23 and a third outlet 25. The cold side is in fluid communication with the first fluid. The second inlet 19 is in fluid communication with the conduit 16 which is in fluid communication with the first means for regulating flow 14. The second outlet 21 is in fluid communication with the conduit 16 which is in fluid communication with the thermoelectric device 20. The hot side is in fluid communication with a second fluid 22. The second fluid 22 flows through the cooling system 10 in HVAC ducting (not shown) or other conduit systems known in the art. The third inlet 23 is in fluid communication with the HVAC ducting which is in fluid communication with the thermoelectric device 20. The third outlet 25 in fluid communication with the HVAC ducting which is in fluid communication with the passenger cabin (not shown). In the embodiment shown, the second heat exchanger 18 is a heater core. The heater core may be a water-to-air heat exchanger used to provide the heated second fluid 22 to the passenger cabin. Any conventional heat exchanger may be used such as a shell and tube heat exchanger, a plate heat exchanger, an air-cooled heat exchanger, or other heating device known in the art.

In the embodiment shown, the second fluid 22 is air. The second fluid 22 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 20 is in fluid communication with the conduit 16 that is in fluid communication with the first heat exchanger 12 and the second heat exchanger 18. The thermoelectric device 20 is also in fluid communication with the second fluid 22. The thermoelectric device 20 may be any conventional device such as the thermoelectric systems described in U.S. Pat. No. 6,539,725 to Bell; quantum tunneling converters; a Peltier device; thermoionic modules; magneto caloric modules; acoustic heating mechanisms; other solid state heat pumping devices; or any combination of the devices listed above. Although a single thermoelectric device 20 is shown, it is understood that additional thermoelectric devices can be used, as desired.

In operation, the first heat exchanger 12 is adapted to cool the first fluid using an ambient air stream 24. The first fluid enters a cold side of the first heat exchanger 12 through the conduit 16 at the inlet 13. The ambient air stream 24 enters a hot side of the first heat exchanger 12 from outside the vehicle. The ambient air stream 24 passes through the hot side of the first heat exchanger 12, thereby cooling the first fluid passing through the cold side of the first heat exchanger 12. The cooled first fluid exits the first heat exchanger 12 through the conduit 16 at an outlet 15 as the ambient air stream 24 exits the hot side of the first heat exchanger 12 and exits the cooling system 10. The ambient air stream 24 is the temperature of the ambient air, such as 120 degrees Fahrenheit on a hot day. It is understood that alternative fluids may be used to cool the first fluid in the first exchanger 12.

The first means for regulating flow 14 circulates the first fluid through the conduit 16 of the cooling system 10. The first means for regulating flow 14 causes the first fluid to flow through the first heat exchanger 12, the second heat exchanger 18, and the thermoelectric device 20.

The second heat exchanger 18 heats a second fluid 22 and cools the first fluid. However, it is understood that in the broadest sense, the second heat exchanger 18 conditions the second fluid 22. Conditioned as used herein means heating, cooling, maintaining a desired temperature, and the like. Thus, although the descriptions herein are limited to heating the second fluid 22, the invention is not so limited. After exiting the first heat exchanger 12, the first fluid is caused to flow through the conduit 16 and enter a cold side of the second heat exchanger 18 at a second inlet 19. The second fluid 22 enters a hot side of the second heat exchanger 18 through a third inlet 23 at a temperature less than a desired temperature. Within the second heat exchanger 18, the second fluid 22 is heated to the desired temperature by the first fluid. The first fluid then exits the second heat exchanger 18 through the conduit 16 at the second outlet 21 and is caused to flow to the thermoelectric device 20 by the first means for regulating flow 14. The second fluid 22 exits the second heat exchanger 18 at a third outlet 25 and flows into the passenger cabin of the vehicle. A passenger in the passenger cabin controls the temperature of the second fluid 22 by setting the desired temperature using passenger cabin controls (not shown).

The thermoelectric device 20, in fluid communication with the first heat exchanger 12 and the second heat exchanger 18, heats the first fluid and cools the second fluid 22. After exiting the second heat exchanger 18, the first means for regulating flow 14 causes the first fluid to flow through the conduit 16 to communicate with the thermoelectric device 20. The first fluid is heated by the thermoelectric device 20 before flowing through the conduit 16 back to the first heat exchanger 12. The second fluid 22 enters the thermoelectric device 20 at an entrance temperature. The second fluid 22 is cooled by the thermoelectric device 20, exits the thermoelectric device 20 at the temperature less than the desired temperature, and flows to the second heat exchanger 18. The temperature is taken to a temperature lower than the desired temperature to aid in the demisting of the second fluid 22.

The second fluid 22 may be heated, cooled, dehumidified, demisted, or otherwise pretreated prior to communicating with the thermoelectric device 20.

The cooling efficiency of the thermoelectric device 20 is affected by a temperature difference or delta-T between the first fluid and the second fluid 22 communicating with the thermoelectric device 20. Because the first fluid entering the second heat exchanger 18 is at a temperature higher than the entrance temperature of the second fluid 22, cooling the first fluid with the second heat exchanger 18 prior to the second fluid 22 entering the thermoelectric device 20 reduces the temperature difference or delta-T between the hot side and cold side of the thermoelectric device 20.

As the delta-T is changed, the coefficient of performance of the thermoelectric device 20 changes in a non-linear fashion. The coefficient of performance (COP) is defined as the ratio of the rate of heat withdrawal from a cold side to the power required to withdraw the same heat. In mathematical form, $COP=|Q|/W$, where Q is the useful heat supplied by the condenser and W is the work consumed by the compressor. As the delta-T is reduced, the COP is increased and an efficiency of the thermoelectric device 20 is increased. The higher the COP, the more efficient the device.

Figure 2:
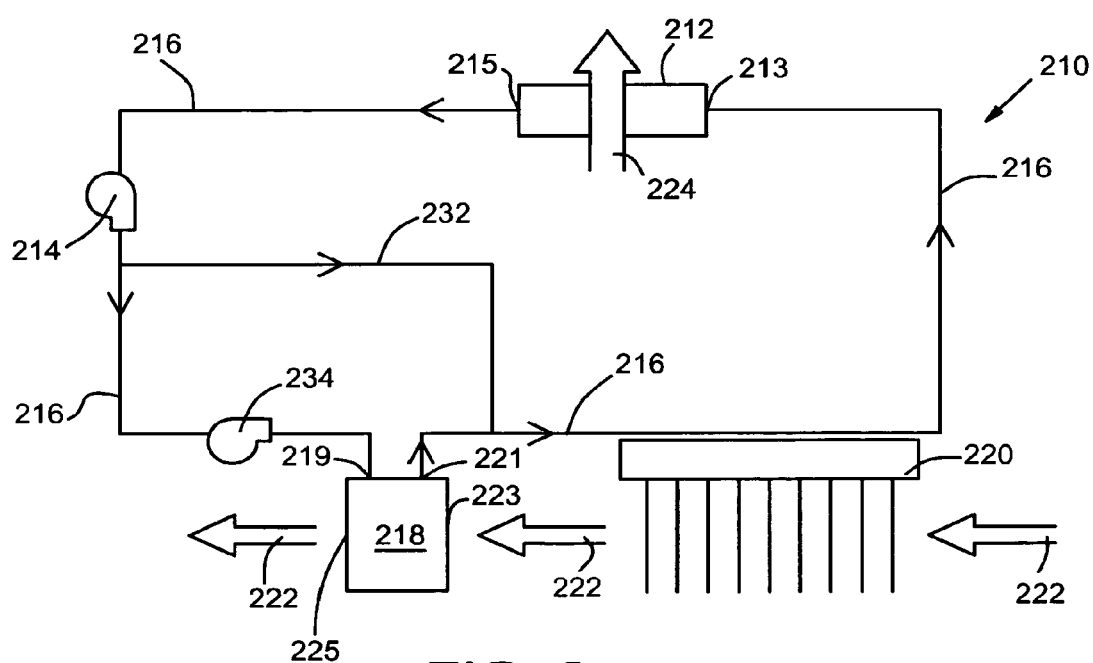
FIG. 2 is a schematic flow diagram of a cooling system according to another embodiment of the invention.

FIG. 2 shows a cooling system 210 that includes a first heat exchanger 212, a first means for regulating flow 214 of a first fluid (not shown) in a conduit 216, a bypass conduit 232, a second means for regulating flow 234 of the first fluid, a second heat exchanger 218, and a thermoelectric device 220.

The first heat exchanger 212 includes a cold side (not shown) with a first inlet 213 and a first outlet 215, and a hot side (not shown). The cold side is in fluid communication with the first fluid. The first inlet 213 is in fluid communication with the conduit 216 which is in fluid communication with the thermoelectric device 220. The first outlet 215 is in fluid communication with the conduit 216 which is in fluid communication with the first means for regulating flow 214. The hot side is in fluid communication with an ambient air stream 224. In the embodiment shown, the first heat exchanger 212 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 214 is a pump disposed between the first heat exchanger 212 and the second heat exchanger 218. The first means for regulating flow 214 may be any pump, such as a positive displacement pump, centrifugal pump, electrostatic pump, or any other pump known in the art. It is understood that the first means for regulating flow 214 may be any fluid controlling device such as a valve, for example. The first means for regulating flow 214 can be located anywhere on the cooling system 210, as desired.

In the embodiment shown, the bypass conduit 232 is disposed between the first means for regulating flow 214 and the thermoelectric device 220 and bypasses the second heat exchanger 218.

In the embodiment shown, the second means for regulating flow 234 is a valve disposed between the first means for regulating flow 214 and the second heat exchanger 218. The second means for regulating flow 234 may be any pump, such as a positive displacement pump, centrifugal pump, electrostatic pump, or any other pump known in the art. It is understood that the second means for regulating flow 234 may be any fluid controlling device such as a valve, for example. The second means for regulating flow 234 can be located either on the bypass conduit 232 or disposed between the first means for regulating flow 214 and the second heat exchanger 218, as desired.

The second heat exchanger 218 includes a cold side (not shown) with a second inlet 219 and a second outlet 221, and a hot side (not shown) with a third inlet 223 and a third outlet 225. The cold side is in fluid communication with the first fluid. The second inlet 219 is in fluid communication with the conduit 216 which is in fluid communication with the first means for regulating flow 214. The second outlet 221 is in fluid communication with the conduit 216 which is in fluid communication with the thermoelectric device 220. The hot side is in fluid communication with a second fluid 222. The second fluid 222 flows through the cooling system 210 in HVAC ducting (not shown) or other conduit systems known in the art. The third inlet 223 is in fluid communication with the HVAC ducting which is in fluid communication with the thermoelectric device 220. The third outlet 225 in fluid communication with the HVAC ducting which is in fluid communication with the passenger cabin. In the embodiment shown, the second heat exchanger 218 is a heater core. The heater core may be a water-to-air heat exchanger used to provide the heated second fluid 222 to the passenger cabin. Any conventional heat exchanger may be used such as a shell and tube heat exchanger, a plate heat exchanger, an air-cooled heat exchanger, or other heating device known in the art.

In the embodiment shown, the second fluid 222 is air. The second fluid 222 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 220 is in fluid communication with the conduit 216 that is in fluid communication with the first heat exchanger 212 and the second heat exchanger 218. The thermoelectric device 220 is also in fluid communication with the second fluid 222. The thermoelectric device 220 may be any conventional device such as the thermoelectric systems described in U.S. Pat. No. 6,539,725 to Bell; quantum tunneling converters; a Peltier device; thermoionic modules; magneto caloric modules; acoustic heating mechanisms; other solid state heat pumping devices; or any combination of the devices listed above. Although a single thermoelectric device 220 is shown, it is understood that additional thermoelectric devices can be used, as desired. Although a single thermoelectric device 220 is shown, it is understood that additional thermoelectric devices can be used, as desired.

In operation, the first heat exchanger 212 is adapted to cool the first fluid using an ambient air stream 224. The first fluid enters a cold side of the first heat exchanger 212 through the conduit 216 at the inlet 213. The ambient air stream 224 enters a hot side of the first heat exchanger 212 from outside the vehicle. The ambient air stream 224 passes through the hot side of the first heat exchanger 212, thereby cooling the first fluid passing through the cold side of the first heat exchanger 212. The cooled first fluid exits the first heat exchanger 212 through the conduit 216 at an outlet 215 as the ambient air stream 224 exits the hot side of the first heat exchanger 212 and exits the cooling system 210. The ambient air stream 224 is the temperature of the ambient air, such as 120 degrees Fahrenheit on a hot day. It is understood that alternative fluids may be used to cool the first fluid in the first exchanger 212.

The first means for regulating flow 214 circulates the first fluid through the conduit 216 of the cooling system 210. The first means for regulating flow 214 causes the first fluid to flow through the first heat exchanger 212, the second heat exchanger 218, and the thermoelectric device 220.

The second means for regulating flow 234 facilitates the flow of the first fluid in the conduit 216 through the conduit 216 to the second heat exchanger 218 and causes at least a portion of the first fluid in the conduit 216 to flow through the bypass conduit 232. Thus, a portion of the first fluid is caused to bypass the second heat exchanger 218. The portion of the first fluid that bypasses the second heat exchanger 218 is caused to flow to the thermoelectric device 220 after rejoining the conduit 216.

The second heat exchanger 218 heats a second fluid 222 and cools the first fluid. After exiting the first heat exchanger 212, the first fluid is caused to flow through the conduit 216 and enter a cold side of the second heat exchanger 218 at a second inlet 219. The second fluid 222 enters a hot side of the second heat exchanger 218 through a third inlet 223 at a temperature less than a desired temperature. Within the second heat exchanger 218, the second fluid 222 is heated to the desired temperature by the first fluid. The first fluid then exits the second heat exchanger 218 through the conduit 216 at the second outlet 221 and is caused to flow to the thermoelectric device 220 by the first means for regulating flow 214. The second fluid 222 exits the second heat exchanger 218 at a third outlet 225 and flows into the passenger cabin of the vehicle. A passenger in the passenger cabin controls the temperature of the second fluid 222 by setting the desired temperature using passenger cabin controls (not shown).

To achieve the desired temperature set by the passenger, a portion of the first fluid is caused to flow through the bypass conduit 232 by the second means for regulating flow 234. The remaining portion of the first fluid is caused to flow through the conduit 216 to the second heat exchanger 218. By flowing through the bypass conduit 232, the amount of the first fluid flowing to the second heat exchanger 218, as well as the temperature of the first fluid flowing to the thermoelectric device 220, is altered. By altering the amount of the first fluid flowing to the second heat exchanger 218 and by altering the temperature of the first fluid flowing to the thermoelectric device 220, the temperature of the second fluid 222 exiting the second heat exchanger 218 is also altered. The amount the temperature of the second fluid 222 is altered depends on the amount of the first fluid bypassing the second heat exchanger 218 through the bypass conduit 232. The amount of the first fluid flowing through the bypass conduit 232 will vary based on the desired temperature set by the passenger for the second fluid 222. Based on the desired temperature setting, the cooling system 210 will dynamically regulate the flow of the first fluid through the bypass conduit 232 to balance the temperatures of the first fluid and the second fluid 222 throughout the cooling system 210. It is understood that all of the first fluid may flow through either the conduit 216 or the bypass conduit 232, or the first fluid can flow through both the conduit 216 and the bypass conduit 232, depending on the desired temperature setting.

The thermoelectric device 220, in fluid communication with the first heat exchanger 212 and the second heat exchanger 218, heats the first fluid and cools the second fluid 222. After exiting the second heat exchanger 218, the first means for regulating flow 214 causes the first fluid to flow through the conduit 216 to communicate with the thermoelectric device 220. The first fluid is heated by the thermoelectric device 220 before flowing through the conduit 216 back to the first heat exchanger 212. The second fluid 222 enters the thermoelectric device 220 at an entrance temperature. The second fluid 222 is cooled by the thermoelectric device 220, exits the thermoelectric device 220 at the temperature less than the desired temperature, and flows to the second heat exchanger 218. The temperature is taken to a temperature lower than the desired temperature to aid in the demisting of the second fluid 222.

The second fluid 222 may be heated, cooled, dehumidified, demisted, or otherwise pretreated prior to communicating with the thermoelectric device 220.

Figure 3:
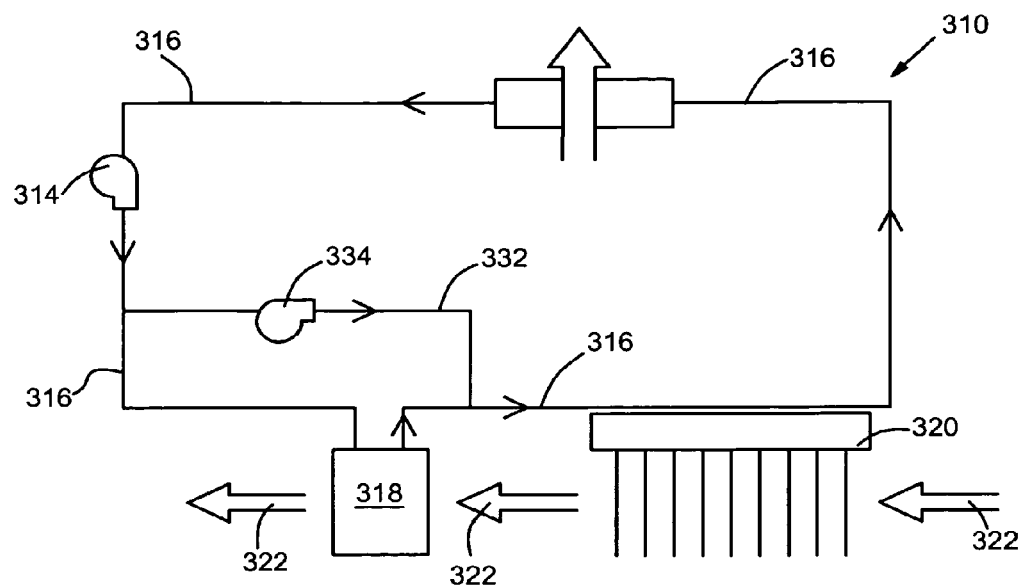
FIG. 3 is a schematic flow diagram of a cooling system according to another embodiment of the invention.

FIG. 3 shows a cooling system 310 according to another embodiment of the invention. The embodiment of FIG. 3 is similar to the cooling system of FIG. 2 except as described below. Like the structure from FIG. 2, FIG. 3 includes reference numerals in the 300s instead of the 200s, with the remaining two digits the same.

In the embodiment shown, the second means for regulating flow 334 is a pump disposed between the first means for regulating flow 314 and the thermoelectric device 320 on the bypass conduit 332. It is understood that the second means for regulating flow 334 can be any conventional flow device such as a valve, for example.

To achieve the desired temperature set by the passenger, flow of the first fluid through the bypass conduit 332 is regulated by the second means for regulating flow 334. The remaining portion of the first fluid is caused to flow through the conduit 316 to the second heat exchanger 318. By flowing through the bypass conduit 332, the amount of the first fluid flowing to the second heat exchanger 318, as well as the temperature of the first fluid flowing to the thermoelectric device 320, is altered. By altering the amount of the first fluid flowing to the second heat exchanger 318 and by altering the temperature of the first fluid flowing to the thermoelectric device 320, the temperature of the second fluid 322 exiting the second heat exchanger 318 is also altered. The amount the temperature of the second fluid 322 is altered depends on the amount of the first fluid bypassing the second heat exchanger 318 through the bypass conduit 332. The amount of the first fluid flowing through the bypass conduit 332 will vary based on the desired temperature set by the passenger for the second fluid 322. Based on the desired temperature setting, the cooling system 310 will dynamically regulate the flow of the first fluid through the bypass conduit 332 to balance the temperatures of the first fluid and the second fluid 322 throughout the cooling system 310. It is understood that all of the first fluid may flow through either the conduit 316 or the bypass conduit 332, or the first fluid can flow through both the conduit 316 and the bypass conduit 332, depending on the desired temperature setting.

Figure 4:
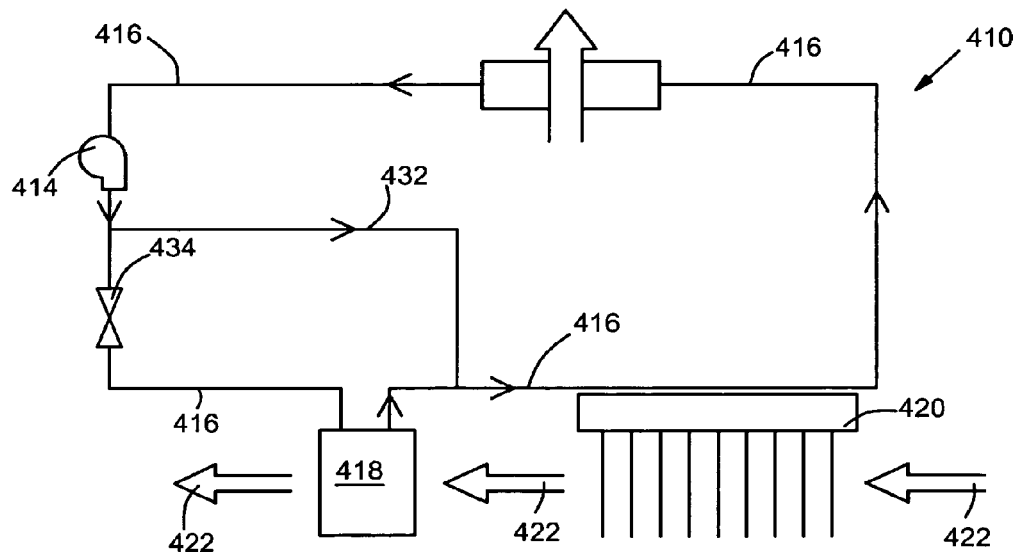
FIG. 4 is a schematic flow diagram of a cooling system according to another embodiment of the invention.

FIG. 4 shows a cooling system 410 according to another embodiment of the invention. The embodiment of FIG. 4 is similar to the cooling system of FIG. 2 except as described below. Like the structure from FIG. 2, FIG. 4 includes reference numerals in the 400s instead of the 200s, with the remaining two digits the same.

In the embodiment shown, the second means for regulating flow 434 is a valve disposed between the first means for regulating flow 414 and the second heat exchanger 418. The second means for regulating flow 434 may be any valve, such as a gate valve, a globe valve, a ball valve, a plug valve, a butterfly valve, or any other valve known in the art. Typically it is desired for the valve to be controlled by an actuator (not shown) connected to a control system (not shown) to control the amount of flow of the first fluid therethrough.

To achieve the desired temperature set by the passenger, flow of the first fluid through the bypass conduit 432 is regulated by the second means for regulating flow 434. A portion of the first fluid is caused to flow through the conduit 416 to the second heat exchanger 418. By flowing through the bypass conduit 432, the amount of the first fluid flowing to the second heat exchanger 418, as well as the temperature of the first fluid flowing to the thermoelectric device 420, is altered. By altering the amount of the first fluid flowing to the second heat exchanger 418 and by altering the temperature of the first fluid flowing to the thermoelectric device 420, the temperature of the second fluid 422 exiting the second heat exchanger 418 is also altered. The amount the temperature of the second fluid 422 is altered depends on the amount of the first fluid bypassing the second heat exchanger 418 through the bypass conduit 432. The amount of the first fluid flowing through the bypass conduit 432 will vary based on the desired temperature set by the passenger for the second fluid 422. Based on the desired temperature setting, the cooling system 410 will dynamically regulate the flow of the first fluid through the bypass conduit 432 to balance the temperatures of the first fluid and the second fluid 422 throughout the cooling system 410. It is understood that all of the first fluid may flow through either the conduit 416 or the bypass conduit 432, or the first fluid can flow through both the conduit 416 and the bypass conduit 432, depending on the desired temperature setting.

Figure 5:
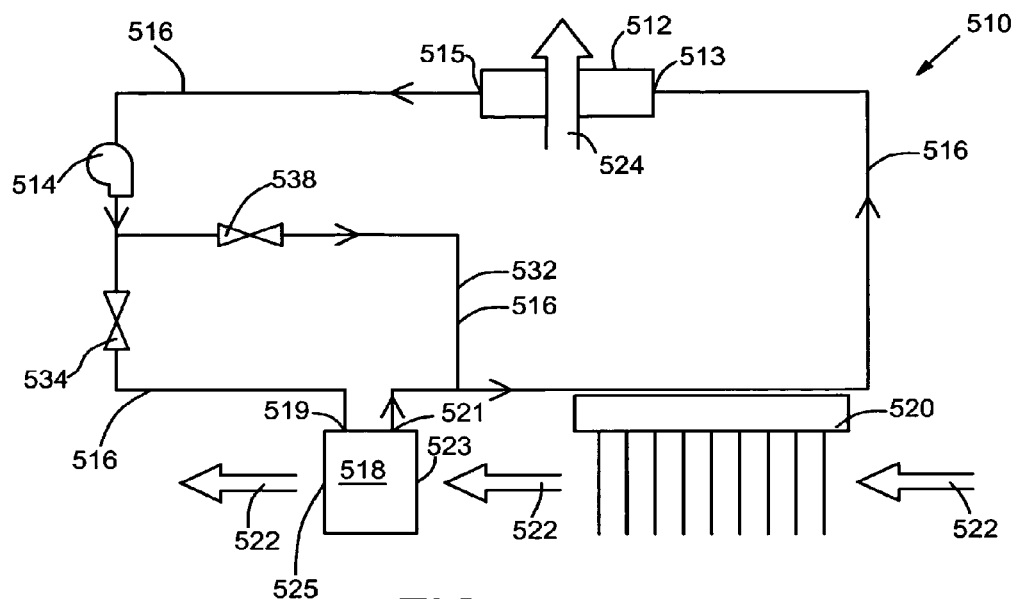
FIG. 5 is a schematic flow diagram of a cooling system according to another embodiment of the invention.

FIG. 5 shows a cooling system 510 that includes a first heat exchanger 512, a first means for regulating flow 514 of a first fluid (not shown) in a conduit 516, a bypass conduit 532, a second means for regulating flow 534 of the first fluid in the conduit 516, a third means for regulating flow 538 of the first fluid in the bypass conduit 532, a second heat exchanger 518, and a thermoelectric device 520.

The first heat exchanger 512 includes a cold side (not shown) with a first inlet 513 and a first outlet 515, and a hot side (not shown). The cold side is in fluid communication with the first fluid. The first inlet 513 is in fluid communication with the conduit 516 which is in fluid communication with the thermoelectric device 520. The first outlet 515 is in fluid communication with the conduit 516 which is in fluid communication with the first means for regulating flow 514. The hot side is in fluid communication with an ambient air stream 524. In the embodiment shown, the first heat exchanger 512 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 514 is a pump disposed between the first heat exchanger 512 and the second heat exchanger 518. The first means for regulating flow 514 may be any pump, such as a positive displacement pump, centrifugal pump, electrostatic pump, or any other pump known in the art. It is understood that the first means for regulating flow 514 may be any fluid controlling device such as a valve, for example. The first means for regulating flow 514 can be located anywhere on the cooling system 510, as desired.

In the embodiment shown, the bypass conduit 532 is disposed between the first means for regulating flow 514 and the thermoelectric device 520 and bypasses the second heat exchanger 518.

In the embodiment shown, the second means for regulating flow 534 is a valve disposed between the first means for regulating flow 514 and the second heat exchanger 518. The second means for regulating flow 534 may be any valve, such as a gate valve, a globe valve, a ball valve, a plug valve, a butterfly valve, or any other valve known in the art. It is understood that the second means for regulating flow 534 may be any fluid controlling device such as a pump, for example.

The third means for regulating flow 538 is a valve disposed between the first means for regulating flow 514 and the thermoelectric device 520 on the bypass conduit 532. The third means for regulating flow 538 may be any valve, such as a gate valve, a globe valve, a ball valve, a plug valve, a butterfly valve, or any other valve known in the art. It is understood that the third means for regulating flow 538 may be any fluid controlling device such as a pump, for example.

The second heat exchanger 518 includes a cold side (not shown) with a second inlet 519 and a second outlet 521, and a hot side (not shown) with a third inlet 523 and a third outlet 525. The cold side is in fluid communication with the first fluid. The second inlet 519 is in fluid communication with the conduit 516 which is in fluid communication with the first means for regulating flow 514. The second outlet 521 is in fluid communication with the conduit 516 which is in fluid communication with the thermoelectric device 520. The hot side is in fluid communication with a second fluid 522. The second fluid 522 flows through the cooling system 510 in HVAC ducting (not shown) or other conduit systems known in the art. The third inlet 523 is in fluid communication with the HVAC ducting which is in fluid communication with the thermoelectric device 520. The third outlet 525 in fluid communication with the HVAC ducting which is in fluid communication with the passenger cabin. In the embodiment shown, the second heat exchanger 518 is a heater core. The heater core may be a water-to-air heat exchanger used to provide the heated second fluid 522 to the passenger cabin. Any conventional heat exchanger may be used such as a shell and tube heat exchanger, a plate heat exchanger, an air-cooled heat exchanger, or other heating device known in the art.

In the embodiment shown, the second fluid 522 is air. The second fluid 522 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 520 is in fluid communication with the conduit 516 that is in fluid communication with the first heat exchanger 512 and the second heat exchanger 518. The thermoelectric device 520 is also in fluid communication with the second fluid 522. The thermoelectric device 520 may be any conventional device such as the thermoelectric systems described in U.S. Pat. No. 6,539,725 to Bell; quantum tunneling converters; a Peltier device; thermoionic modules; magneto caloric modules; acoustic heating mechanisms; other solid state heat pumping devices; or any combination of the devices listed above.

Although a single thermoelectric device 520 is shown, it is understood that additional thermoelectric devices can be used, as desired. Although a single thermoelectric device 520 is shown, it is understood that additional thermoelectric devices can be used, as desired.

In operation, the first heat exchanger 512 is adapted to cool the first fluid using an ambient air stream 524. The first fluid enters a cold side of the first heat exchanger 512 through the conduit 516 at the inlet 513. The ambient air stream 524 enters a hot side of the first heat exchanger 512 from outside the vehicle. The ambient air stream 524 passes through the hot side of the first heat exchanger 512, thereby cooling the first fluid passing through the cold side of the first heat exchanger 512. The cooled first fluid exits the first heat exchanger 512 through the conduit 516 at an outlet 515 as the ambient air stream 524 exits the hot side of the first heat exchanger 512 and exits the cooling system 510. The ambient air stream 524 is the temperature of the ambient air, such as 120 degrees Fahrenheit on a hot day. It is understood that alternative fluids may be used to cool the first fluid in the first exchanger 512.

The first means for regulating flow 514 circulates the first fluid through the conduit 516 of the cooling system 510. The first means for regulating flow 514 causes the first fluid to flow through the first heat exchanger 512, the second heat exchanger 518, and the thermoelectric device 520.

The second means for regulating flow 534 facilitates the flow of at least a portion of the first fluid in the conduit 516 through the conduit 516 to the second heat exchanger 518. The third means for regulating flow 538 facilitates the flow of the first fluid not flowing to the second heat exchanger 518 through the bypass conduit 532, thereby bypassing the second heat exchanger 518. The portion of the first fluid that bypasses the second heat exchanger 518 is caused to flow to the thermoelectric device 520 after rejoining the conduit 516. It is understood that it may be desirable that the first fluid is not permitted to flow through the bypass conduit 532. Typically it is desired for the valves to be controlled by actuators (not shown) connected to a control system (not shown) to control the amount of flow of the first fluid therethrough.

The second heat exchanger 518 heats a second fluid 522 and cools the first fluid. After exiting the first heat exchanger 512, the first fluid is caused to flow through the conduit 516 and enter a cold side of the second heat exchanger 518 at a second inlet 519. The second fluid 522 enters a hot side of the second heat exchanger 518 through a third inlet 523 at a temperature less than a desired temperature. Within the second heat exchanger 518, the second fluid 522 is heated to the desired temperature by the first fluid. The first fluid exits the second heat exchanger 518 through the conduit 516 at the second outlet 521 and is caused to flow to the thermoelectric device 520. The second fluid 522 exits the second heat exchanger 518 at a third outlet 525 and flows into the passenger cabin of the vehicle. A passenger in the passenger cabin controls the temperature of the second fluid 522 by setting the desired temperature using passenger cabin controls (not shown).

To achieve the desired temperature set by the passenger, flow of the first fluid through the bypass conduit 532 is regulated by the third means for regulating flow 538. A portion of the first fluid is caused to flow through the bypass conduit 532 to bypass the second heat exchanger 518 by the third means for regulating flow 538. By flowing through the bypass conduit 532, the amount of the first fluid flowing to the second heat exchanger 518, as well as the temperature of the first fluid flowing to the thermoelectric device 520, is altered. By altering the amount of the first fluid flowing to the second heat exchanger 518 and by altering the temperature of the first fluid flowing to the thermoelectric device 520, the temperature of the second fluid 522 exiting the second heat exchanger 518 is also altered. The amount the temperature of the second fluid 522 is altered depends on the amount of the first fluid bypassing the second heat exchanger 518 through the bypass conduit 532. The amount of the first fluid flowing through the bypass conduit 532 will vary based on the desired temperature set by the passenger for the second fluid 522. Based on the desired temperature setting, the cooling system 510 will dynamically regulate the flow of the first fluid through the bypass conduit 532 to balance the temperatures of the first fluid and the second fluid 522 throughout the cooling system 510. It is understood that all of the first fluid may flow through either the conduit 516 or the bypass conduit 532, or the first fluid can flow through both the conduit 516 and the bypass conduit 532, depending on the desired temperature setting.

The thermoelectric device 520, in fluid communication with the first heat exchanger 512 and the second heat exchanger 518, heats the first fluid and cools the second fluid 522. After exiting the second heat exchanger 518, the first means for regulating flow 514 causes the first fluid to flow through the conduit 516 to communicate with the thermoelectric device 520. The first fluid is heated by the thermoelectric device 520 before flowing through the conduit 516 back to the first heat exchanger 512. The second fluid 522 enters the thermoelectric device 520 at an entrance temperature. The second fluid 522 is cooled by the thermoelectric device 520, exits the thermoelectric device 520 at the temperature less than the desired temperature, and flows to the second heat exchanger 518. The temperature is taken to a temperature lower than the desired temperature to aid in the demisting of the second fluid 522.

The second fluid 522 may be heated, cooled, dehumidified, demisted, or otherwise pretreated prior to communicating with the thermoelectric device 520.

Figure 6:
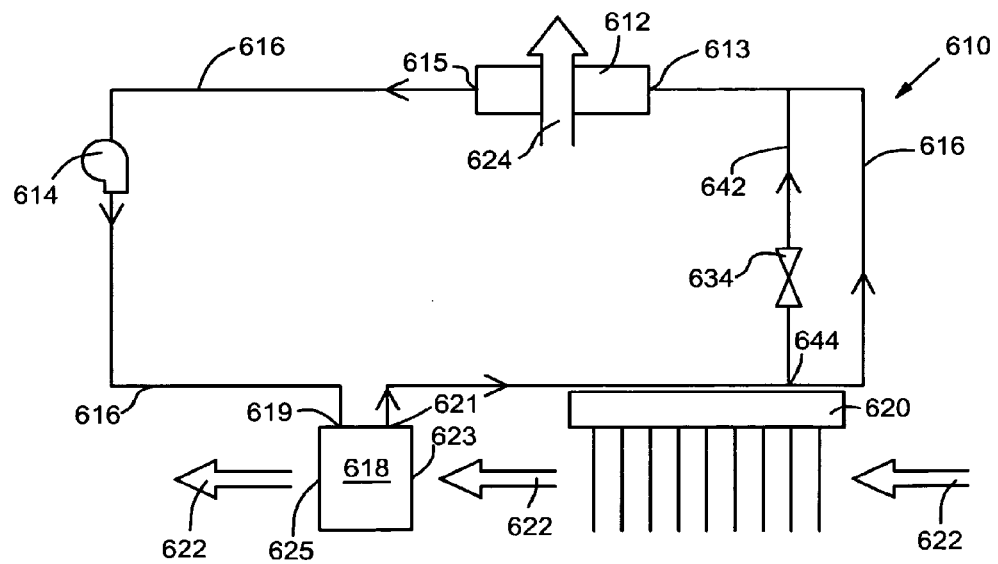
FIG. 6 is a schematic flow diagram of a cooling system according to another embodiment of the invention.

FIG. 6 shows a cooling system 610 that includes a first heat exchanger 612, a first means for regulating flow 614 of a first fluid (not shown) in a conduit 616, a second heat exchanger 618, a thermoelectric device 620, a thermoelectric device bypass 642, and a second means for regulating flow 634 of the first fluid in the thermoelectric device bypass 642.

The first heat exchanger 612 includes a cold side (not shown) with a first inlet 613 and a first outlet 615, and a hot side (not shown). The cold side is in fluid communication with the first fluid. The first inlet 613 is in fluid communication with the conduit 616 which is in fluid communication with the thermoelectric device bypass 642 and the thermoelectric device 620. The first outlet 615 is in fluid communication with the conduit 616 which is in fluid communication with the first means for regulating flow 614. The hot side is in fluid communication with an ambient air stream 624. In the embodiment shown, the first heat exchanger 612 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 614 is a pump disposed between the first heat exchanger 612 and the second heat exchanger 618. The first means for regulating flow 614 may be any pump, such as a positive displacement pump, centrifugal pump, electrostatic pump, or any other pump known in the art. It is understood that the first means for regulating flow 614 may be any fluid controlling device such as a valve, for example. The first means for regulating flow 614 can be located anywhere on the cooling system 610, as desired.

The second heat exchanger 618 includes a cold side (not shown) with a second inlet 619 and a second outlet 621, and a hot side (not shown) with a third inlet 623 and a third outlet 625. The cold side is in fluid communication with the first fluid. The second inlet 619 is in fluid communication with the conduit 616 which is in fluid communication with the first means for regulating flow 614. The second outlet 621 is in fluid communication with the conduit 616 which is in fluid communication with the thermoelectric device 620. The hot side is in fluid communication with a second fluid 622. The second fluid 622 flows through the cooling system 610 in HVAC ducting (not shown) or other conduit systems known in the art. The third inlet 623 is in fluid communication with the HVAC ducting which is in fluid communication with the thermoelectric device 620. The third outlet 625 in fluid communication with the HVAC ducting which is in fluid communication with the passenger cabin. In the embodiment shown, the second heat exchanger 618 is a heater core. The heater core may be a water-to-air heat exchanger used to provide the heated second fluid 622 to the passenger cabin. Any conventional heat exchanger may be used such as a shell and tube heat exchanger, a plate heat exchanger, an air-cooled heat exchanger, or other heating device known in the art.

In the embodiment shown, the second fluid 622 is air. The second fluid 622 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 620 is in fluid communication with the conduit 616 that is in fluid communication with the first heat exchanger 612 and the second heat exchanger 618. The thermoelectric device 620 is also in fluid communication with the second fluid 622. The thermoelectric device 620 may be any conventional device such as the thermoelectric systems described in U.S. Pat. No. 6,539,725 to Bell; quantum tunneling converters; a Peltier device; thermoionic modules; magneto caloric modules; acoustic heating mechanisms; other solid state heat pumping devices; or any combination of the devices listed above. Although a single thermoelectric device 620 is shown, it is understood that additional thermoelectric devices can be used, as desired. Although a single thermoelectric device 620 is shown, it is understood that additional thermoelectric devices can be used, as desired.

The thermoelectric device bypass 642 is disposed between the first heat exchanger 612 and the thermoelectric device 620 at a point 644 along the thermoelectric device 620 to provide a fluid conduit that bypasses a portion of the thermoelectric device 620.

In the embodiment shown, the second means for regulating flow 634 is a valve disposed between the thermoelectric device 620 and the first heat exchanger 612 on the thermoelectric device bypass 642. The second means for regulating flow 634 may be any valve, such as a gate valve, a globe valve, a ball valve, a plug valve, a butterfly valve, or any other valve known in the art. It is understood that the second means for regulating flow 634 may be any fluid controlling device such as a pump, for example.

In operation, the first heat exchanger 612 is adapted to cool the first fluid using an ambient air stream 624. The first fluid enters a cold side of the first heat exchanger 612 through the conduit 616 at the inlet 613. The ambient air stream 624 enters a hot side of the first heat exchanger 612 from outside the vehicle. The ambient air stream 624 passes through the hot side of the first heat exchanger 612, thereby cooling the first fluid passing through the cold side of the first heat exchanger 612. The cooled first fluid exits the first heat exchanger 612 through the conduit 616 at an outlet 615 as the ambient air stream 624 exits the hot side of the first heat exchanger 612 and exits the cooling system 610. The ambient air stream 624 is the temperature of the ambient air, such as 120 degrees Fahrenheit on a hot day. It is understood that alternative fluids may be used to cool the first fluid in the first exchanger 612.

The first means for regulating flow 614 circulates the first fluid through the conduit 616 of the cooling system 610. The first means for regulating flow 614 causes the first fluid to flow through the first heat exchanger 612, the second heat exchanger 618, and the thermoelectric device 620.

The second heat exchanger 618 heats a second fluid 622 and cools the first fluid. After exiting the first heat exchanger 612, the first fluid is caused to flow through the conduit 616 and enter a cold side of the second heat exchanger 618 at a second inlet 619. The second fluid 622 enters a hot side of the second heat exchanger 618 through a third inlet 623 at a temperature less than a desired temperature. Within the second heat exchanger 618, the second fluid 622 is heated to the desired temperature by the first fluid. The first fluid exits the second heat exchanger 618 through the conduit 616 at the second outlet 621 and is caused to flow to the thermoelectric device 620. The second fluid 622 exits the second heat exchanger 618 at a third outlet 625 and flows into the passenger cabin of the vehicle. A passenger in the passenger cabin controls the temperature of the second fluid 622 by setting the desired temperature using passenger cabin controls (not shown).

The thermoelectric device 620, in fluid communication with the first heat exchanger 612 and the second heat exchanger 618, heats the first fluid and cools the second fluid 622. After exiting the second heat exchanger 618, the first means for regulating flow 614 causes the first fluid to flow through the conduit 616 to communicate with the thermoelectric device 620. The first fluid is heated by the thermoelectric device 620 before flowing through the conduit 616 back to the first heat exchanger 612. The second means for regulating flow 634 facilitates the flow of at least a portion 636 of the first fluid in the thermoelectric device 620 to flow through the thermoelectric device bypass 642 to bypass a portion of the thermoelectric device 620 at the point 644 along the thermoelectric device 620. The portion of the first fluid that bypasses the portion of the thermoelectric device 620 is caused to flow to the first heat exchanger 612 after rejoining the conduit 616. It is understood that it may be desirable that the first fluid is not permitted to flow through the thermoelectric device bypass 642. Typically it is desired for the valve to be controlled by actuators (not shown) connected to a control system (not shown) to control the amount of flow of the first fluid therethrough.

The second fluid 622 enters the thermoelectric device 620 at an entrance temperature. The second fluid 622 is cooled by the thermoelectric device 620, exits the thermoelectric device 620 at the temperature less than the desired temperature, and flows to the second heat exchanger 618. The temperature is taken to a temperature lower than the desired temperature to aid in the demisting of the second fluid 622. The second fluid 622 may be heated, cooled, dehumidified, demisted, or otherwise pretreated prior to communicating with the thermoelectric device 620.

To achieve the desired temperature set by the passenger, flow of the first fluid through the thermoelectric device bypass 642 is regulated by the second means for regulating flow 634. By flowing through the thermoelectric device bypass 642, the amount of the first fluid flowing through the entire thermoelectric device 620, as well as the temperature of the first fluid flowing to the first heat exchanger 612, is altered. By altering the amount of the first fluid flowing through the thermoelectric device 620 and by altering the temperature of the first fluid flowing to the first heat exchanger 612, the temperature of the first fluid entering the second heat exchanger 618 is altered, thereby altering the temperature of the second fluid 622 exiting the second heat exchanger 618. The amount the temperature of the second fluid 622 is altered depends on the amount of the first fluid bypassing the thermoelectric device 620 through the thermoelectric device bypass 642. The amount of the first fluid flowing through the thermoelectric device bypass 642 will vary based on the desired temperature set by the passenger for the second fluid 622. Based on the desired temperature setting, the cooling system 610 will dynamically regulate the flow of the first fluid through the thermoelectric device bypass 642 to balance the temperatures of the first fluid and the second fluid 622 throughout the cooling system 610. It is understood that all of the first fluid may flow through either the conduit 616 or the thermoelectric device bypass 642, or the first fluid can flow through both the conduit 616 and the thermoelectric device bypass 642, depending on the desired temperature setting.

Figure 7:
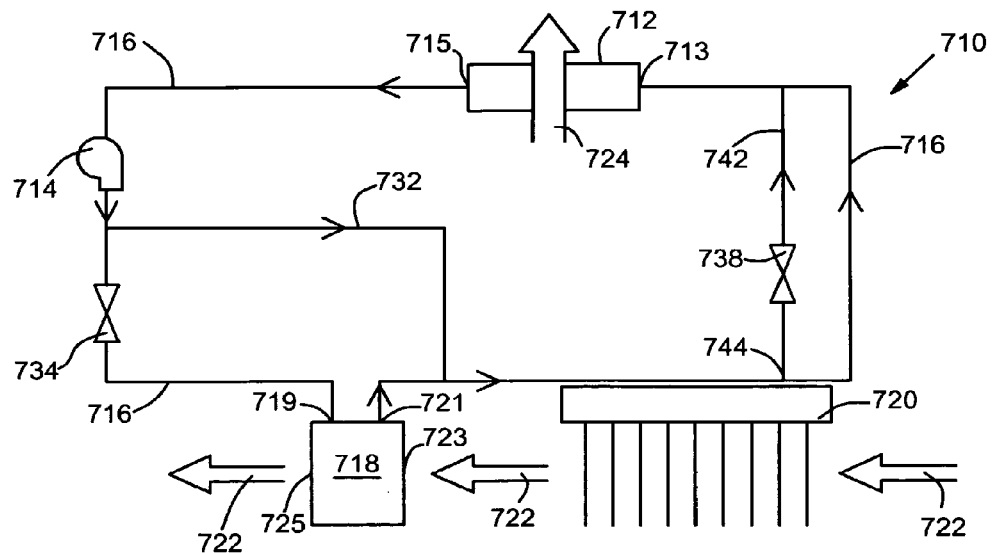
FIG. 7 is a schematic flow diagram of a cooling system according to another embodiment of the invention.

FIG. 7 shows a cooling system 710 that includes a first heat exchanger 712, a first means for regulating flow 714 of a first fluid (not shown) in a conduit 716, a bypass conduit 732, a second means for regulating flow 734 of the first fluid in the conduit 716, a second heat exchanger 718, a thermoelectric device 720, a thermoelectric device bypass 742, and a third means for regulating flow 738 of the first fluid in the thermoelectric device bypass 742.

The first heat exchanger 712 includes a cold side (not shown) with a first inlet 713 and a first outlet 715, and a hot side (not shown). The cold side is in fluid communication with the first fluid. The first inlet 713 is in fluid communication with the conduit 716 which is in fluid communication with the thermoelectric device 642 and the thermoelectric device 720. The first outlet 715 is in fluid communication with the conduit 716 which is in fluid communication with the first means for regulating flow 714. The hot side is in fluid communication with an ambient air stream 724. In the embodiment shown, the first heat exchanger 712 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 714 is a pump disposed between the first heat exchanger 712 and the second heat exchanger 718. The first means for regulating flow 714 may be any pump, such as a positive displacement pump, centrifugal pump, electrostatic pump, or any other pump known in the art. It is understood that the first means for regulating flow 714 may be any fluid controlling device such as a valve, for example. The first means for regulating flow 714 can be located anywhere on the cooling system 710, as desired.

In the embodiment shown, the bypass conduit 732 is disposed between the first means for regulating flow 714 and the thermoelectric device 720 and bypasses the second heat exchanger 718.

In the embodiment shown, the second means for regulating flow 734 is a valve disposed between the first means for regulating flow 714 and the second heat exchanger 718. The second means for regulating flow 734 may be any valve, such as a gate valve, a globe valve, a ball valve, a plug valve, a butterfly valve, or any other valve known in the art. It is understood that the second means for regulating flow 734 may be any fluid controlling device such as a pump, for example.

The second heat exchanger 718 includes a cold side (not shown) with a second inlet 719 and a second outlet 721, and a hot side (not shown) with a third inlet 723 and a third outlet 725. The cold side is in fluid communication with the first fluid. The second inlet 719 is in fluid communication with the conduit 716 which is in fluid communication with the first means for regulating flow 714. The second outlet 721 is in fluid communication with the conduit 716 which is in fluid communication with the thermoelectric device 720. The hot side is in fluid communication with a second fluid 722. The second fluid 722 flows through the cooling system 710 in HVAC ducting (not shown) or other conduit systems known in the art. The third inlet 723 is in fluid communication with the HVAC ducting which is in fluid communication with the thermoelectric device 720. The third outlet 725 in fluid communication with the HVAC ducting which is in fluid communication with the passenger cabin. In the embodiment shown, the second heat exchanger 718 is a heater core. The heater core may be a water-to-air heat exchanger used to provide the heated second fluid 722 to the passenger cabin. Any conventional heat exchanger may be used such as a shell and tube heat exchanger, a plate heat exchanger, an air-cooled heat exchanger, or other heating device known in the art.

In the embodiment shown, the second fluid 722 is air. The second fluid 722 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 720 is in fluid communication with the conduit 716 that is in fluid communication with the first heat exchanger 712 and the second heat exchanger 718. The thermoelectric device 720 is also in fluid communication with the second fluid 722. The thermoelectric device 720 may be any conventional device such as the thermoelectric systems described in U.S. Pat. No. 6,539,725 to Bell; quantum tunneling converters; a Peltier device; thermoionic modules; magneto caloric modules; acoustic heating mechanisms; other solid state heat pumping devices; or any combination of the devices listed above. Although a single thermoelectric device 720 is shown, it is understood that additional thermoelectric devices can be used, as desired. Although a single thermoelectric device 720 is shown, it is understood that additional thermoelectric devices can be used, as desired.

The thermoelectric device bypass 742 is disposed between the first heat exchanger 712 and the thermoelectric device 720 at a point 744 along the thermoelectric device 720 to provide a fluid conduit that bypasses a portion of the thermoelectric device 720.

In the embodiment shown, the third means for regulating flow 738 is a valve disposed between the thermoelectric device 720 and the first heat exchanger 712 on the thermoelectric device bypass 742. The third means for regulating flow 738 may be any valve, such as a gate valve, a globe valve, a ball valve, a plug valve, a butterfly valve, or any other valve known in the art. It is understood that the third means for regulating flow 738 may be any fluid controlling device such as a pump, for example.

In operation, the first heat exchanger 712 is adapted to cool the first fluid using an ambient air stream 724. The first fluid enters a cold side of the first heat exchanger 712 through the conduit 716 at the inlet 713. The ambient air stream 724 enters a hot side of the first heat exchanger 712 from outside the vehicle. The ambient air stream 724 passes through the hot side of the first heat exchanger 712, thereby cooling the first fluid passing through the cold side of the first heat exchanger 712. The cooled first fluid exits the first heat exchanger 712 through the conduit 716 at an outlet 715 as the ambient air stream 724 exits the hot side of the first heat exchanger 712 and exits the cooling system 710. The ambient air stream 724 is the temperature of the ambient air, such as 120 degrees Fahrenheit on a hot day. It is understood that alternative fluids may be used to cool the first fluid in the first exchanger 712.

The first means for regulating flow 714 circulates the first fluid through the conduit 716 of the cooling system 710. The first means for regulating flow 714 causes the first fluid to flow through the first heat exchanger 712, the second heat exchanger 718, and the thermoelectric device 720.

The second means for regulating flow 734 facilitates the flow of the first fluid in the conduit 716 through the conduit 716 to the second heat exchanger 718 and causes at least a portion of the first fluid in the conduit 716 to flow through the bypass conduit 732. Thus, a portion of the first fluid is caused to bypass the second heat exchanger 718. The portion of the first fluid that bypasses the second heat exchanger 718 is caused to flow to the thermoelectric device 720 after rejoining the conduit 716. It is understood that it may be desirable that the first fluid is not permitted to flow through the bypass conduit 732. Typically it is desired for the valve to be controlled by an actuator (not shown) connected to a control system (not shown) to control the amount of flow of the first fluid therethrough.

The second heat exchanger 718 heats a second fluid 722 and cools the first fluid. After exiting the first heat exchanger 712, the first fluid is caused to flow through the conduit 716 and enter a cold side of the second heat exchanger 718 at a second inlet 719. The second fluid 722 enters a hot side of the second heat exchanger 718 through a third inlet 723 at a temperature less than a desired temperature. Within the second heat exchanger 718, the second fluid 722 is heated to the desired temperature by the first fluid. The first fluid exits the second heat exchanger 718 through the conduit 716 at the second outlet 721 and is caused to flow to the thermoelectric device 720. The second fluid 722 exits the second heat exchanger 718 at a third outlet 725 and flows into the passenger cabin of the vehicle. A passenger in the passenger cabin controls the temperature of the second fluid 722 by setting the desired temperature using passenger cabin controls (not shown).

The thermoelectric device 720, in fluid communication with the first heat exchanger 712 and the second heat exchanger 718, heats the first fluid and cools the second fluid 722. After exiting the second heat exchanger 718, the first means for regulating flow 714 causes the first fluid to flow through the conduit 716 to communicate with the thermoelectric device 720. The first fluid is heated by the thermoelectric device 720 before flowing through the conduit 716 back to the first heat exchanger 712. The second means for regulating flow 734 facilitates the flow of at least a portion 736 of the first fluid in the thermoelectric device 720 to flow through the thermoelectric device bypass 742 to bypass a portion of the thermoelectric device 720 at the desired point 744 along the thermoelectric device 720. The portion of the first fluid that bypasses the portion of the thermoelectric device 720 is caused to flow to the first heat exchanger 712 after rejoining the conduit 716. It is understood that it may be desirable that the first fluid is not permitted to flow through the thermoelectric device bypass 742. Typically it is desired for the valve to be controlled by actuators (not shown) connected to a control system (not shown) to control the amount of flow of the first fluid therethrough.

The second fluid 722 enters the thermoelectric device 720 at an entrance temperature. The second fluid 722 is cooled by the thermoelectric device 720, exits the thermoelectric device 720 at the temperature less than the desired temperature, and flows to the second heat exchanger 718. The temperature is taken to a temperature lower than the desired temperature to aid in the demisting of the second fluid 722. The second fluid 722 may be heated, cooled, dehumidified, demisted, or otherwise pretreated prior to communicating with the thermoelectric device 720.

To achieve the desired temperature set by the passenger, flow of the first fluid through the bypass conduit 732 is regulated by the second means for regulating flow 734, and the flow of the first fluid through the thermoelectric device bypass 742 is regulated by the third means for regulating flow 738.

A portion of the first fluid is caused to flow through the bypass conduit 732 to the thermoelectric 720 by the second means for regulating flow 734. The remaining portion of the first fluid is caused to flow through the conduit 716 to the second heat exchanger 718. By flowing through the bypass conduit 732, the amount of the first fluid flowing to the second heat exchanger 718, as well as the temperature of the first fluid flowing to the thermoelectric device 720, is altered. By altering the amount of the first fluid flowing to the second heat exchanger 718 and by altering the temperature of the first fluid flowing to the thermoelectric device 720, the temperature of the second fluid 722 exiting the second heat exchanger 718 is also altered.

By flowing through the thermoelectric device bypass 742, the amount of the first fluid flowing through the entire thermoelectric device 720, as well as the temperature of the first fluid flowing to the first heat exchanger 712, is altered. By altering the amount of the first fluid flowing through the thermoelectric device 720 and by altering the temperature of the first fluid flowing to the first heat exchanger 712, the temperature of the first fluid entering the second heat exchanger 718 is altered, thereby altering the temperature of the second fluid 722 exiting the second heat exchanger 718. The amount the temperature of the second fluid 722 is altered depends on the amount of the first fluid bypassing the thermoelectric device 720 through the thermoelectric device bypass 742.

The amount of the first fluid flowing through the bypass conduit 732 or thermoelectric device bypass 742 will vary based on the desired temperature set by the passenger for the second fluid 722. Based on the desired temperature setting, the cooling system 710 will dynamically regulate the flow of the first fluid through the bypass conduit 732 and thermoelectric device bypass 742 to balance the temperatures of the first fluid and the second fluid 722 throughout the cooling system 710. It is understood that all of the first fluid may exclusively flow through the conduit 716, the bypass conduit 732, the thermoelectric device bypass 742, or any combination thereof, depending on the desired temperature setting.

Figure 8:
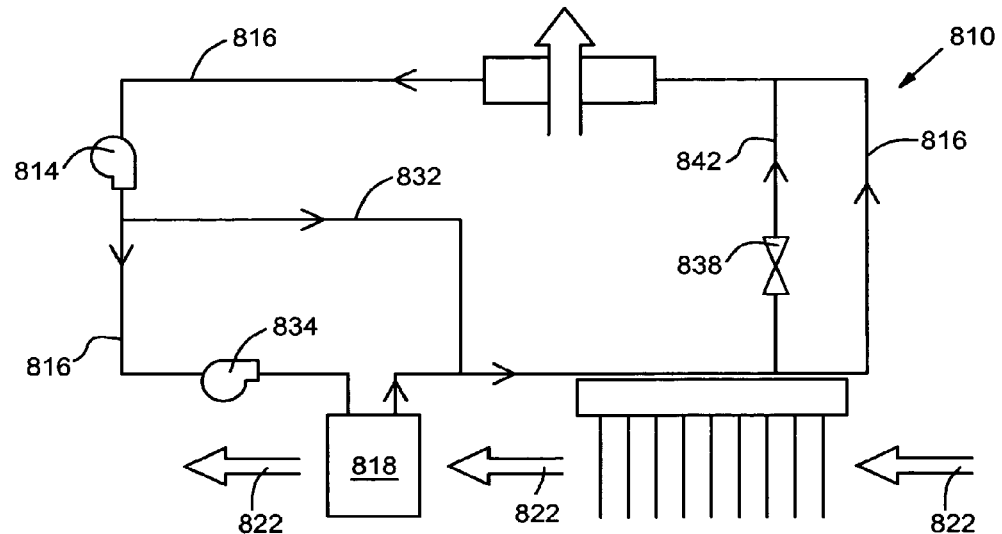
FIG. 8 is a schematic flow diagram of a cooling system according to another embodiment of the invention.

FIG. 8 shows a cooling system 810 according to another embodiment of the invention. The embodiment of FIG. 8 is similar to the cooling system of FIG. 7 except as described below. Like the structure from FIG. 7, FIG. 8 includes reference numerals in the 800s instead of the 700s, with the remaining two digits the same.

In the embodiment shown, the second means for regulating flow 834 is a pump disposed between the first means for regulating flow 814 on the conduit 816. The amount of the first fluid flowing through the bypass conduit 832 or thermoelectric device bypass 842 will vary based on the desired temperature set by the passenger for the second fluid 822. Based on the desired temperature setting, the cooling system 810 will dynamically regulate the flow of the first fluid through the bypass conduit 832 and thermoelectric device bypass 842 to balance the temperatures of the first fluid and the second fluid 822 throughout the cooling system 810. It is understood that all of the first fluid may exclusively flow through the conduit 816, the bypass conduit 832, the thermoelectric device bypass 842, or any combination thereof, depending on the desired temperature setting.

Figure 9:
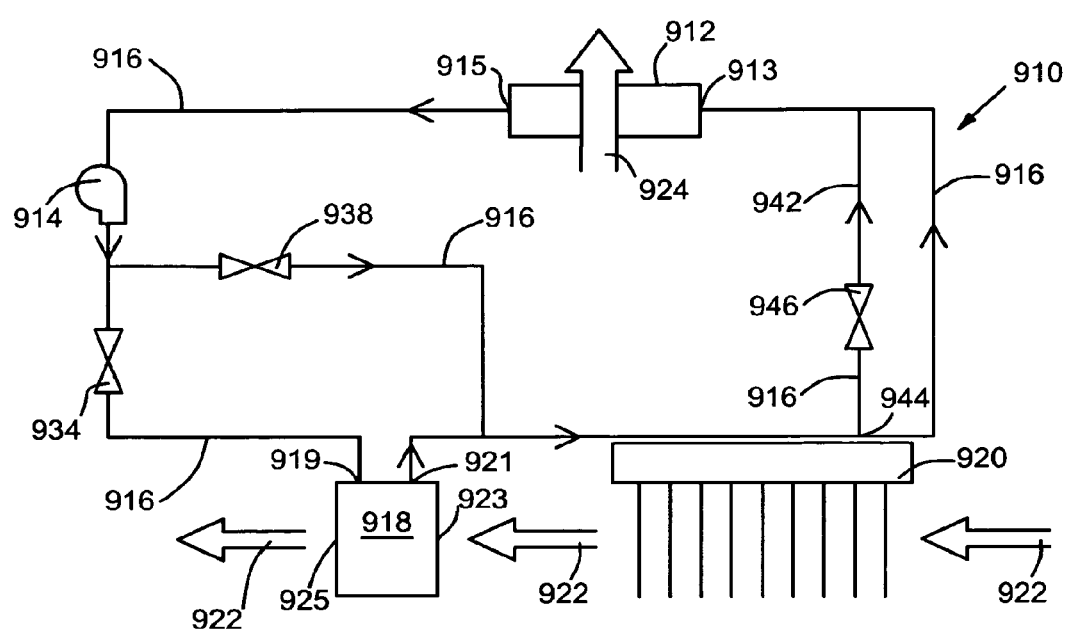
FIG. 9 is a schematic flow diagram of a cooling system according to another embodiment of the invention.

FIG. 9 shows a cooling system 910 that includes a first heat exchanger 912, a first means for regulating flow 914 of a first fluid (not shown) in a conduit 916, a bypass conduit 932, a second means for regulating flow 934 of the first fluid in the conduit 916, a third means for regulating flow 938 of the first fluid in the bypass conduit 932, a second heat exchanger 918, a thermoelectric device 920, a thermoelectric device bypass 942, and a fourth means for regulating flow 946 of the first fluid in the thermoelectric device bypass 942.

The first heat exchanger 912 includes a cold side (not shown) with a first inlet 913 and a first outlet 915, and a hot side (not shown). The cold side is in fluid communication with the first fluid. The first inlet 913 is in fluid communication with the conduit 916 which is in fluid communication with the thermoelectric device bypass 642 and the thermoelectric device 920. The first outlet 915 is in fluid communication with the conduit 916 which is in fluid communication with the first means for regulating flow 914. The hot side is in fluid communication with an ambient air stream 924. In the embodiment shown, the first heat exchanger 912 is a low-temperature core. It is understood that any conventional heat exchanger may be used such as a shell and tube heat exchanger, a plate heat exchanger, an air-cooled heat exchanger, or other cooling device known in the art. The first fluid is a liquid having a mix of water and glycol. It is understood that the first fluid may also be water or any other liquid, gas, coolant, or multipurpose solid-liquid convection medium as desired.

In the embodiment shown, the first means for regulating flow 914 is a pump disposed between the first heat exchanger 912 and the second heat exchanger 918. The first means for regulating flow 914 may be any pump, such as a positive displacement pump, centrifugal pump, electrostatic pump, or any other pump known in the art. It is understood that the first means for regulating flow 914 may be any fluid controlling device such as a valve, for example. The first means for regulating flow 914 can be located anywhere on the cooling system 910, as desired.

In the embodiment shown, the bypass conduit 932 is disposed between the first means for regulating flow 914 and the thermoelectric device 920 and bypasses the second heat exchanger 918.

In the embodiment shown, the second means for regulating flow 934 is a valve disposed between the first means for regulating flow 914 and the second heat exchanger 918. The second means for regulating flow 934 may be any valve, such as a gate valve, a globe valve, a ball valve, a plug valve, a butterfly valve, or any other valve known in the art. It is understood that the second means for regulating flow 934 may be any fluid controlling device such as a pump, for example.

The third means for regulating flow 938 is a valve disposed between the first means for regulating flow 914 and the thermoelectric device 920 on the bypass conduit 932. The third means for regulating flow 938 may be any valve, such as a gate valve, a globe valve, a ball valve, a plug valve, a butterfly valve, or any other valve known in the art. It is understood that the third means for regulating flow 938 may be any fluid controlling device such as a pump, for example.

The second heat exchanger 918 includes a cold side (not shown) with a second inlet 919 and a second outlet 921, and a hot side (not shown) with a third inlet 923 and a third outlet 925. The cold side is in fluid communication with the first fluid. The second inlet 919 is in fluid communication with the conduit 916 which is in fluid communication with the first means for regulating flow 914. The second outlet 921 is in fluid communication with the conduit 916 which is in fluid communication with the thermoelectric device 920. The hot side is in fluid communication with a second fluid 922. The second fluid 922 flows through the cooling system 910 in HVAC ducting (not shown) or other conduit systems known in the art. The third inlet 923 is in fluid communication with the HVAC ducting which is in fluid communication with the thermoelectric device 920. The third outlet 925 in fluid communication with the HVAC ducting which is in fluid communication with the passenger cabin. In the embodiment shown, the second heat exchanger 918 is a heater core. The heater core may be a water-to-air heat exchanger used to provide the heated second fluid 922 to the passenger cabin. Any conventional heat exchanger may be used such as a shell and tube heat exchanger, a plate heat exchanger, an air-cooled heat exchanger, or other heating device known in the art.

In the embodiment shown, the second fluid 922 is air. The second fluid 922 may be ambient air from outside the passenger cabin or re-circulated air from inside the passenger cabin. It is understood that other fluids can be used such as a liquid, a gas, a coolant, or a multipurpose solid-liquid convection medium, for example.

The thermoelectric device 920 is in fluid communication with the conduit 916 that is in fluid communication with the first heat exchanger 912 and the second heat exchanger 918. The thermoelectric device 920 is also in fluid communication with the second fluid 922. The thermoelectric device 920 may be any conventional device such as the thermoelectric systems described in U.S. Pat. No. 6,539,725 to Bell; quantum tunneling converters; a Peltier device; thermoionic modules; magneto caloric modules;

acoustic heating mechanisms; other solid state heat pumping devices; or any combination of the devices listed above. Although a single thermoelectric device 920 is shown, it is understood that additional thermoelectric devices can be used, as desired. Although a single thermoelectric device 920 is shown, it is understood that additional thermoelectric devices can be used, as desired.

The thermoelectric device bypass 942 is disposed between the first heat exchanger 912 and the thermoelectric device 920 at a point 944 along the thermoelectric device 920 to provide a fluid conduit that bypasses a portion of the thermoelectric device 920.

In the embodiment shown, the fourth means for regulating flow 946 is a valve disposed between the thermoelectric device 920 and the first heat exchanger 912 on the thermoelectric device bypass 942. The fourth means for regulating flow 946 may be any valve, such as a gate valve, a globe valve, a ball valve, a plug valve, a butterfly valve, or any other valve known in the art. It is understood that the fourth means for regulating flow 946 may be any fluid controlling device such as a pump, for example.

In operation, the first heat exchanger 912 is adapted to cool the first fluid using an ambient air stream 924. The first fluid enters a cold side of the first heat exchanger 912 through the conduit 916 at the inlet 913. The ambient air stream 924 enters a hot side of the first heat exchanger 912 from outside the vehicle. The ambient air stream 924 passes through the hot side of the first heat exchanger 912, thereby cooling the first fluid passing through the cold side of the first heat exchanger 912. The cooled first fluid exits the first heat exchanger 912 through the conduit 916 at an outlet 915 as the ambient air stream 924 exits the hot side of the first heat exchanger 912 and exits the cooling system 910. The ambient air stream 924 is the temperature of the ambient air, such as 120 degrees Fahrenheit on a hot day. It is understood that alternative fluids may be used to cool the first fluid in the first exchanger 912.

The first means for regulating flow 914 circulates the first fluid through the conduit 916 of the cooling system 910. The first means for regulating flow 914 causes the first fluid to flow through the first heat exchanger 912, the second heat exchanger 918, and the thermoelectric device 920.

The second means for regulating flow 934 facilitates the flow of at least a portion of the first fluid in the conduit 916 through the conduit 916 to the second heat exchanger 918. The third means for regulating flow 938 facilitates the flow of the first fluid not flowing to the second heat exchanger 918 through the bypass conduit 932, thereby bypassing the second heat exchanger 918. The portion of the first fluid that bypasses the second heat exchanger 918 is caused to flow to the thermoelectric device 920 after rejoining the conduit 916. It is understood that it may be desirable that the first fluid is not permitted to flow through the bypass conduit 932. Typically it is desired for the valves to be controlled by actuators (not shown) connected to a control system (not shown) to control the amount of flow of the first fluid therethrough.

The second heat exchanger 918 heats a second fluid 922 and cools the first fluid. After exiting the first heat exchanger 912, the first fluid is caused to flow through the conduit 916 and enter a cold side of the second heat exchanger 918 at a second inlet 919. The second fluid 922 enters a hot side of the second heat exchanger 918 through a third inlet 923 at a temperature less than a desired temperature. Within the second heat exchanger 918, the second fluid 922 is heated to the desired temperature by the first fluid. The first fluid exits the second heat exchanger 918 through the conduit 916 at the second outlet 921 and is caused to flow to the thermoelectric device 920. The second fluid 922 exits the second heat exchanger 918 at a third outlet 925 and flows into the passenger cabin of the vehicle. A passenger in the passenger cabin controls the temperature of the second fluid 922 by setting the desired temperature using passenger cabin controls (not shown).

The thermoelectric device 920, in fluid communication with the first heat exchanger 912 and the second heat exchanger 918, heats the first fluid and cools the second fluid 922. After exiting the second heat exchanger 918, the first means for regulating flow 914 causes the first fluid to flow through the conduit 916 to communicate with the thermoelectric device 920. The first fluid is heated by the thermoelectric device 920 before flowing through the conduit 916 back to the first heat exchanger 912. The fourth means for regulating flow 946 facilitates the flow of at least a portion 936 of the first fluid in the thermoelectric device 920 to flow through the thermoelectric device bypass 942 to bypass a portion of the thermoelectric device 920 at the desired point 944 along the thermoelectric device 920. The portion of the first fluid that bypasses the portion of the thermoelectric device 920 is caused to flow to the first heat exchanger 912 after rejoining the conduit 916. It is understood that it may be desirable that the first fluid is not permitted to flow through the thermoelectric device bypass 942. Typically it is desired for the valve to be controlled by actuators (not shown) connected to a control system (not shown) to control the amount of flow of the first fluid therethrough.

The second fluid 922 enters the thermoelectric device 920 at an entrance temperature. The second fluid 922 is cooled by the thermoelectric device 920, exits the thermoelectric device 920 at the temperature less than the desired temperature, and flows to the second heat exchanger 918. The temperature is taken to a temperature lower than the desired temperature to aid in the demisting of the second fluid 922. The second fluid 922 may be heated, cooled, dehumidified, demisted, or otherwise pretreated prior to communicating with the thermoelectric device 920.

To achieve the desired temperature set by the passenger, flow of the first fluid through the bypass conduit 932 is regulated by the second means for regulating flow 934 and the third means for regulating flow 938, and the flow of the first fluid through the thermoelectric device bypass 942 is regulated by the fourth means for regulating flow 946.

A portion of the first fluid is caused to flow through the bypass conduit 932 to the thermoelectric device 920 by the second means for regulating flow 934 or the third means for regulating flow 938. The remaining portion of the first fluid is caused to flow through the conduit 916 to the second heat exchanger 918. By flowing through the bypass conduit 932, the amount of the first fluid flowing to the second heat exchanger 918, as well as the temperature of the first fluid flowing to the thermoelectric device 920, is altered. By altering the amount of the first fluid flowing to the second heat exchanger 918 and by altering the temperature of the first fluid flowing to the thermoelectric device 920, the temperature of the second fluid 922 exiting the second heat exchanger 918 is also altered.

By flowing through the thermoelectric device bypass 942, the amount of the first fluid flowing through the entire thermoelectric device 920, as well as the temperature of the first fluid flowing to the first heat exchanger 912, is altered. By altering the amount of the first fluid flowing through the thermoelectric device 920 and by altering the temperature of the first fluid flowing to the first heat exchanger 912, the temperature of the first fluid entering the second heat exchanger 918 is altered, thereby altering the temperature of the second fluid 922 exiting the second heat exchanger 918. The amount the temperature of the second fluid 922 is altered depends on the amount of the first fluid bypassing the thermoelectric device 920 through the thermoelectric device bypass 942.

The amount of the first fluid flowing through the bypass conduit 932 or thermoelectric device bypass 942 will vary based on the desired temperature set by the passenger for the second fluid 922. Based on the desired temperature setting, the cooling system 910 will dynamically regulate the flow of the first fluid through the bypass conduit 932 and thermoelectric device bypass 942 to balance the temperatures of the first fluid and the second fluid 922 throughout the cooling system 910. It is understood that all of the first fluid may exclusively flow through the conduit 916, the bypass conduit 932, or the thermoelectric device bypass 942, or any combination thereof, depending on the desired temperature setting.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for cooling an area using a cooling system, the method comprising:

circulating a working fluid through a heat sink heat exchanger adapted to cool the working fluid;

circulating the working fluid through a feedback heat exchanger in fluid communication with the heat sink heat exchanger;

transferring energy between the working fluid and a second fluid to condition the second fluid to reach a desired temperature;

directing the working fluid to a thermoelectric device disposed between and in fluid communication with the heat sink heat exchanger and the feedback heat exchanger, the thermoelectric device configured to heat the working fluid and cool the second fluid to a temperature lower than the desired temperature; and transferring energy between the working fluid and the second fluid using the feedback heat exchanger to increase a coefficient of performance of the thermoelectric device.

2. The method of claim 1, wherein the working fluid is circulated using a pump.

3. The method of claim 1, wherein the heat sink heat exchanger comprises a low-temperature core.

4. The method of claim 1, wherein the feedback heat exchanger comprises a heater core.

5. The method of claim 1, wherein the working fluid is a liquid and the fluid is a gas.

6. The method of claim 5, wherein the working fluid is water and the fluid is air.

7. A method for cooling an area using a cooling system, the method comprising:

circulating a first fluid through a first heat exchanger adapted to cool the first fluid;

circulating the first fluid through a second heat exchanger in fluid communication with the first heat exchanger;

transferring energy between the first fluid and a second fluid to condition the second fluid to reach a desired temperature;

directing the first fluid to a thermoelectric device disposed between and in fluid communication with the first heat exchanger and the second heat exchanger, the thermoelectric device configured to heat the first fluid and cool the second fluid to a temperature lower than the desired temperature;

transferring energy between the first fluid and the second fluid using the second heat exchanger to increase a coefficient of performance of the thermoelectric device; and a thermoelectric device bypass, wherein the thermoelectric device bypass is configured to cause at least a portion of the first fluid to bypass at least a portion of the thermoelectric device.

8. The method of claim 7, further comprising circulating the at least a portion of the first fluid through the thermoelectric device bypass using a flow regulator disposed between the thermoelectric device and the first heat exchanger.

9. The method of claim 8, wherein the flow regulator comprises a valve.

10. The method of claim 7, wherein the thermoelectric device bypass is configured such that the at least a portion of the first fluid does not flow through the second heat exchanger.

11. The method of claim 1, wherein the thermoelectric device comprises a hot side and a cold side, and the feedback heat exchanger is configured to reduce a temperature difference between the hot side and the cold side of the thermoelectric device.

12. The method of claim 1, wherein the desired temperature is set by controls located in a passenger compartment.

13. The method of claim 1, wherein circulating the working fluid through the heat sink heat exchanger and the feedback heat exchanger comprises circulating the working fluid in a first conduit system.

14. The method of claim 13, wherein the second fluid flows through a second conduit system in fluid communication with a passenger compartment of a vehicle.

15. A method for cooling an area using a cooling system, the method comprising:

circulating a first fluid through a first heat exchanger adapted to cool the first fluid;

providing a thermoelectric device disposed between and in fluid communication with the first heat exchanger and a second heat exchanger, the thermoelectric device configured to heat the first fluid and cool a second fluid;

providing a bypass conduit disposed between the first heat exchanger and the thermoelectric device, wherein the bypass conduit is configured to facilitate a flow of at least a portion of the first fluid from said first heat exchanger through the bypass conduit to the thermoelectric device such that the at least a portion of the first fluid does not flow through the second heat exchanger;

circulating the at least a portion of the first fluid through the bypass conduit; and transferring energy between the first fluid and the second fluid using the thermoelectric device.

16. The method of claim 15, further comprising a flow regulator disposed between the first heat exchanger and the second heat exchanger, wherein the at least a portion of the first fluid is circulated through the bypass conduit using the flow regulator.

17. The method of claim 16, wherein the flow regulator comprises a valve.

18. The method of claim 16, wherein the flow regulator comprises a pump.

19. A method for cooling an area using a cooling system, the method comprising:

circulating a working fluid through a heat sink heat exchanger adapted to cool the working fluid;

circulating the working fluid through a feedback heat exchanger in fluid communication with the heat sink heat exchanger;

transferring energy between the working fluid and a second fluid using the feedback heat exchanger to condition the second fluid to reach a desired temperature;

providing a thermoelectric device disposed between and in fluid communication with the heat sink heat exchanger and the feedback heat exchanger, the thermoelectric device comprising a hot side and a cold side and configured to heat the working fluid and cool the second fluid to a temperature lower than the desired temperature; and reducing a temperature difference between the hot side and the cold side of the thermoelectric device using the feedback heat exchanger.

20. The method of claim 19, wherein the thermoelectric device is configured to aid in demisting of the second fluid by cooling the second fluid to a temperature lower than the desired temperature.

21. The method of claim 1, wherein the working fluid is a liquid and the second fluid is a liquid.

* * * * *